United States Patent
Ishida et al.

(10) Patent No.: US 7,430,618 B2
(45) Date of Patent: *Sep. 30, 2008

(54) DATA TRANSFER CONTROL DEVICE AND ELECTRONIC EQUIPMENT

(75) Inventors: Takuya Ishida, Sapporo (JP); Yoshiyuki Kamihara, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 579 days.

This patent is subject to a terminal disclaimer.

(21) Appl. No.: 11/017,858

(22) Filed: Dec. 22, 2004

(65) Prior Publication Data

US 2005/0105549 A1    May 19, 2005

Related U.S. Application Data

(63) Continuation of application No. 09/787,218, filed as application No. PCT/JP00/04639 on Jul. 12, 2000, now Pat. No. 6,857,028.

(30) Foreign Application Priority Data

Jul. 15, 1999  (JP) .................................. 11-201250

(51) Int. Cl.
G06F 3/00 (2006.01)
G06F 13/00 (2006.01)
G06F 13/42 (2006.01)
G06F 15/16 (2006.01)

(52) U.S. Cl. .............................. 710/5; 710/33; 710/105; 709/231

(58) Field of Classification Search ............... 710/5, 710/29, 33, 52, 57, 105–107; 709/231–232; 370/218, 389, 392, 902, 912
See application file for complete search history.

(56) References Cited

U.S. PATENT DOCUMENTS 5,787,255 A    7/1998   Parlan et al.

(Continued)

FOREIGN PATENT DOCUMENTS

JP    58101544 A   6/1983

(Continued)

OTHER PUBLICATIONS

Bloks, "The IEEE-1394 High Speed Serial Bus," *Philips Journal of Research*, vol. 50, No. 1, pp. 209-216, 1996.

(Continued)

*Primary Examiner*—Khanh Dang
*Assistant Examiner*—Thomas J Cleary
(74) *Attorney, Agent, or Firm*—Oliff & Berridge, PLC

(57) ABSTRACT

An objective of the present invention is to provide a data transfer control device and electronic equipment which make it possible to reduce processing overheads in the firmware and implement high-speed data transfer. In a data transfer control device in accordance with the IEEE 1394 standard, the header of a packet is written to a header area, the ORB (data for SBP-2) of the packet is written to an ORB area, and the stream (data for the application layer) of the packet is written to a stream area. The stream area is managed by hardware in accordance with full and empty signals. Indication information is comprised within a transaction label tl of a request packet, and the header, ORB, and stream of a response packet are written to areas indicated by the indication information comprised within tl, when the response packet is received. The device is also provided with registers TSR and TER that contain addresses TS and TE for securing a transmission area in the stream area and registers RSR and RER that contain addresses RS and RE for securing a reception area therein.

8 Claims, 25 Drawing Sheets

U.S. PATENT DOCUMENTS

| | | |
|---|---|---|
| 6,115,770 A | 9/2000 | Gehman |
| 6,272,114 B1 | 8/2001 | Kobayashi |
| 6,351,783 B1 | 2/2002 | Garney et al. |
| 6,363,428 B1 | 3/2002 | Chou et al. |
| 6,385,113 B1 | 5/2002 | Longwell et al. |
| 6,510,156 B1 | 1/2003 | Brock et al. |

FOREIGN PATENT DOCUMENTS

| | | |
|---|---|---|
| JP | 06069913 A | 3/1994 |
| JP | A 06-069913 | 3/1994 |
| JP | A 10-222440 | 8/1998 |
| JP | A 11-017773 | 1/1999 |
| JP | A 2000-134229 | 5/2000 |
| JP | A 2000-134230 | 5/2000 |
| JP | A 2000-134231 | 5/2000 |
| JP | A 2000-134232 | 5/2000 |
| JP | A 2000-134233 | 5/2000 |
| JP | A 2000-134242 | 5/2000 |
| WO | WO 00/25215 A1 | 5/2000 |
| WO | WO 00/25216 A1 | 5/2000 |
| WO | WO 00/25217 A1 | 5/2000 |

OTHER PUBLICATIONS

U.S. Appl. No. 09/737,760, filed Dec. 18, 2000, Matsunaga et al.
New U.S. National Stage of PCT/JP00/04637 (U.S. Appl. No. 09/787,077), Mar. 14, 2001, Ishida et al.
New U.S. National Stage of PCT/JP00/04638 (6,725,413-issued Apr. 20, 2004), Mar. 14, 2001, Ishida.

RAM (PACKET STORAGE MEANS)

(Conventional Art)

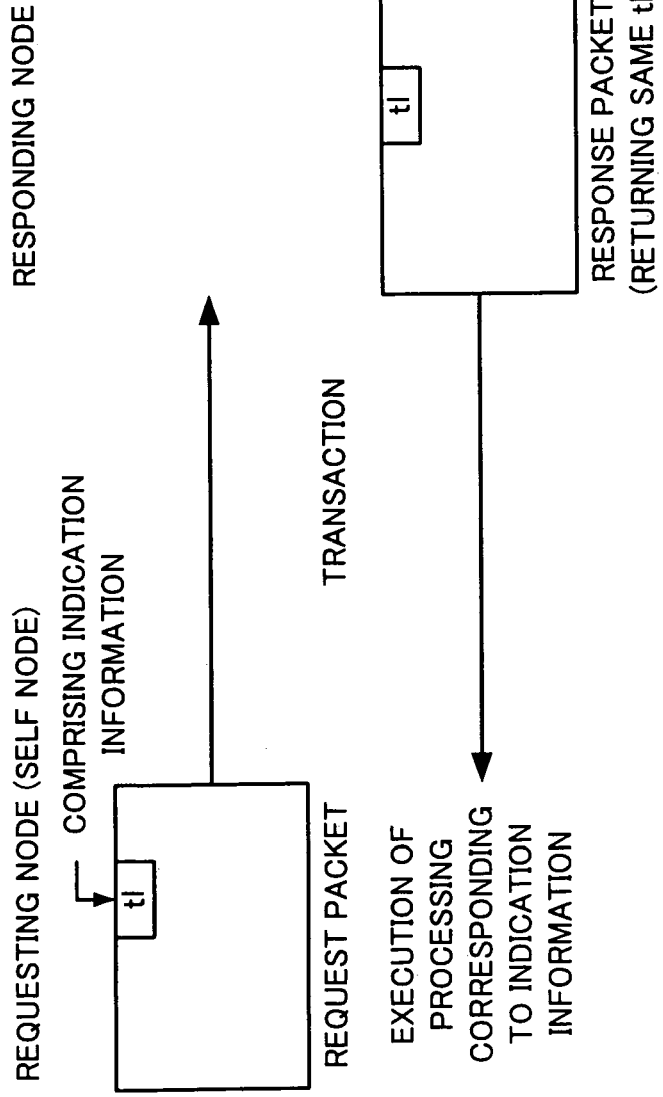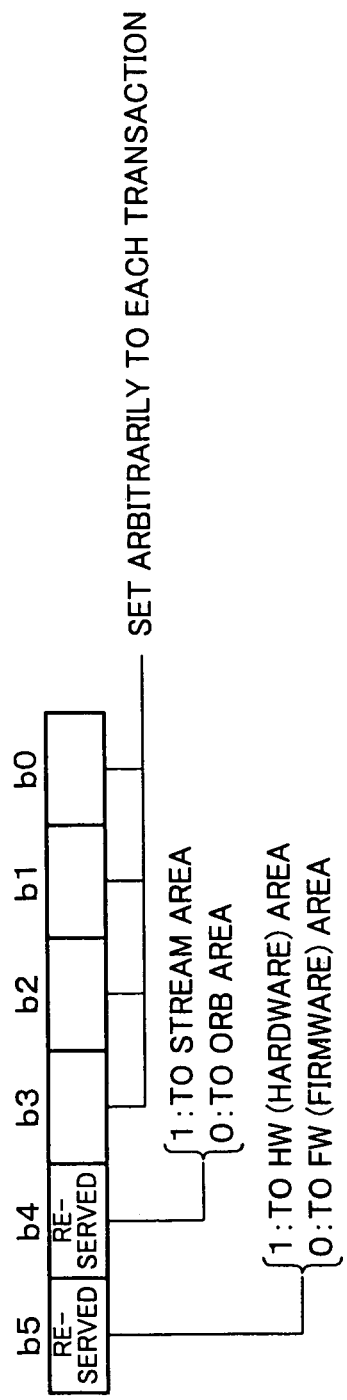

FIRST MODE

SECOND MODE

THIRD MODE

FOURTH MODE

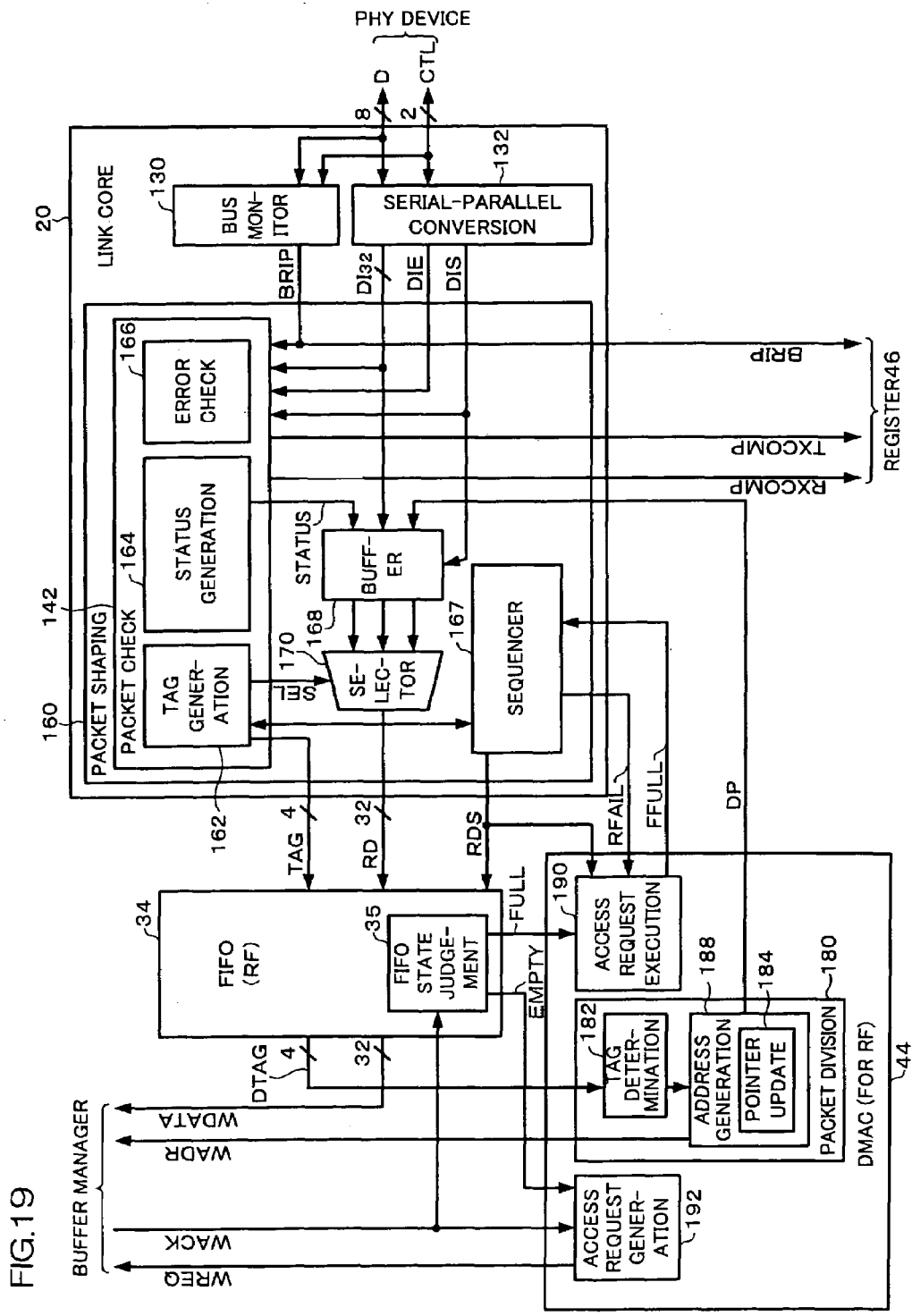

RxAsynchronousPacket BlockWriteReq,BlockReadResp,LockReq,LockResp

FIG.21

| TAG(DTAG) | MEANING |
|---|---|
| 0001 | FW-SOP |
| 0010 | FW-HDR |
| 0011 | FW-FTR |
| 0100 | FW-ORB |
| 0101 | FW-STRM |
| 1001 | HW-SOP |
| 1010 | HW-HDR |
| 1011 | HW-FTR |
| 1100 | HW-ORB |
| 1101 | HW-STRM |

FW ······ FIRMWARE
HW ······ HARDWARE
SOP ······ START OF PACKET
(INITIAL QUADLET OF RECEIVED PACKET)
HDR ······ HEADER OTHER THAN SOP
FTR ······ ACK TRANSMISSION
ORB ······ ORB (DATA)
STRM ······ STREAM (DATA)

DATA TRANSFER CONTROL DEVICE AND ELECTRONIC EQUIPMENT

This is a Continuation of application Ser. No. 09/787,218 filed Mar. 15, 2001, which in turn is a U.S. National Stage of PCT/JP00/04639 filed Jul. 12, 2000 which claims priority from JP 11-201250 filed Jul. 15, 1999. The entire disclosure of each of the prior applications is hereby incorporated by reference herein in its entirety.

TECHNICAL FIELD

The present invention relates to a data transfer control device and electronic equipment, and, in particular, to a data transfer control device and electronic equipment for performing data transfer that is based on a standard such as IEEE 1394 between a plurality of nodes that are connected to a bus.

BACKGROUND ART

An interface standard called IEEE 1394 has recently been attracting much attention. This IEEE 1394 lays down standards for high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-RW drives, and hard disk drives, but also to domestic appliances such as video cameras, VTRs, and TVs. This standard is therefore expected to enable a dramatic acceleration of the digitalization of electronic equipment.

However, it has become clear that there are some technical problems that can occur in a data transfer control device in accordance with IEEE 1394, as described below.

That is to say, the current IEEE 1394 standard does make it possible to implement transfer speeds up to a maximum of 400 Mbps. In practice, however, the presence of processing overheads forces the actual transfer speeds of the entire system to be much slower. In other words, the firmware and application software running on a CPU require large amounts of time for processes such as preparing to receive data and fetching the receive data, which means it is not possible to implement high-speed data transfer overall, no matter how fast the data can be transferred over the buses.

A particular problem lies in the fact that a CPU incorporated into peripheral equipment has a lower processing capability than the CPU incorporated into the host system, such as a personal computer. This makes the problem of processing overheads in the firmware and application software extremely serious. It is therefore desirable to provide techniques that are capable of efficiently solving this overhead problem.

DISCLOSURE OF THE INVENTION

The present invention was devised in the light of the above described problems and has as an objective thereof the provision of a data transfer control device that can reduce the processing overheads in firmware or the like and implement high-speed data transfer within compact hardware, and electronic equipment using the same.

In order to solve the above described problems, one aspect of the present invention relates to a data transfer control device for transferring data between a plurality of nodes connected to a bus, the data transfer control device comprising: link means which provides services for packet transfer between nodes; write means which writes a packet that has been received through the link means to a randomly accessible packet storage means; and packet division means which writes control information of the packet to a control information area of the packet storage means, writes first data of the packet for a first layer (such as a transaction layer) to a first data area of the packet storage means, and writes second data of the packet for a second layer (such as an application layer) that is a layer above the first layer to a second data area of the packet storage means.

This aspect of the present invention makes it possible to write the control information of a packet (such as its header or footer) to a control information area, first data of the packet (such as data for the transaction layer) to a first data area, and second data of the packet (such as data for the application layer) to a second data area. This configuration makes it possible to read the second data sequentially from the second data area for transfer to the second layer. This enables a dramatic increase in the data transfer speed.

Note that the first data may be command data used by the protocol of the first layer and the second data may be data used by an application layer.

The data transfer control device of the present invention may further comprise area management means which makes a full signal go active when the second data area is full, to inhibit the write means from writing the second data to the second data area, and makes an empty signal go active when the second data area is empty, to inhibit the second layer from reading the second data from the second data area. This configuration makes it possible to automate and speed up the data transfer, such that the writing of the second data to the second data area and the reading of the second data from the second data can be controlled by simply providing management by the area management means.

When a request packet which is used for starting a transaction is transmitted to a responding node, transaction identification information comprised within the request packet may include indication information which indicates processing to be performed when a response packet from the responding node is received; and the control information and the first and second data of the response packet may be written into an area specified by the indication information within the transaction identification information of the response packet, when the response packet from the responding node is received. This configuration makes it possible to automatically write the control information, first data, and second data of a response packet to the areas specified by the indication information, without the intervention of the firmware, when the response packet comes in from the responding node. The processing load on the firmware or the like can therefore be dramatically reduced.

Another aspect of the present invention relates to a data transfer control device for transferring data between a plurality of nodes connected to a bus, the data transfer control device comprising: means which makes transaction identification information within a request packet include indication information which indicates processing to be performed after reception of a response packet from a responding node, when the request packet which is used for starting a transaction is transmitted to the responding node; and means which performs the processing indicated by the indication information comprised within the transaction identification information of the response packet, when the response packet from the responding node is received.

This aspect of the present invention enables processing in accordance with the indication information comprised within the transaction identification information (for example, transaction label), when a response packet is returned from the responding node. It is therefore possible to automate the processing that is performed when a response packet is returned, which enables a reduction in the processing load on the firmware or the like and also tends to increase the data transfer speed.

Control information and data of the response packet may be written into an area specified by the indication information within the transaction identification information of the response packet, when the response packet from the responding node is received. Note that the processing that is performed when the response packet is returned is not limited to writing to the thus-specified areas.

A given bit of the transaction identification information may be previously reserved as a bit for expressing the indication information. This makes it possible to perform processing for inserting indication information into the transaction identification information of the request packet and processing for identifying the indication information, based on the transaction identification information of the response packet, in a simple manner with a low load on the system.

Note that the transaction identification information may be a transaction label in accordance with the IEEE 1394 standard.

A further aspect of the present invention relates to a data transfer control device for transferring data between a plurality of nodes connected to a bus, the data transfer control device comprising: link means which provides services for packet transfer between nodes; randomly accessible packet storage means which stores a packet; write means which writes a packet that has been received from another node through the link means, to the packet storage means; and means which reads the packet that has been written to the packet storage means and transfers the packet to the link means; wherein the packet storage means is divided into a control information area in which is stored packet control information and a data area in which is stored packet data, and the data area is divided into a first data area for storing first data for a first layer and a second data area for storing second data for a second layer.

Since the packet storage means is divided into a control information area, a first data area, and a second data area in accordance with this aspect of the present invention, it is possible to read the second data sequentially from the second data area or write second data sequentially to the second data area. This enables a dramatic increase in the data transfer speed.

The data transfer control device of the present invention may further comprise: a first address storage means which stores a transmission area start address for reserving a transmission area in the second data area; a second address storage means which stores a transmission area end address for reserving a transmission area in the second data area; a third address storage means which stores a reception area start address for reserving a reception area in the second data area; and a fourth address storage means which stores a reception area end address for reserving a reception area in the second data area. This makes it possible to use the second data area in a manner that suits the characteristics of a device in the second layer (such as the application layer): as a dedicated transmission area, a dedicated reception area, or an area used in common for both transmission and reception.

The transmission area start address and the reception area start address may be set to the start address of the second data area, and transmission area end address and the reception area end address may be set to the end address of the second data area. This makes it possible to use the second data area as an area used in common for both transmission and reception. It is therefore possible to provide the optimal data transfer control device for a second-layer device that transfers data in both directions from another node to the self node and from the self node to another node. Moreover, the storage capacity of the second data area can be utilized to the maximum limit, both during transmission and during reception, making it possible to store a large amount of data in the second data area.

Both the transmission area start address and the transmission area end address may be set to either the start address or the end address of the second data area, the reception area start address may be set to the start address of the second data area, and the reception area end address may be set to the end address of the second data area. This configuration makes it possible to use the second data area as a dedicated reception area. It is therefore possible to provide the optimal data transfer control device for a second-layer device in which no large amounts of data flow in the direction from another node to the self node.

Both the reception area start address and the reception area end address may be set to either the start address or the end address of the second data area, the transmission area start address may be set to the start address of the second data area, and the transmission area end address may be set to the end address of the second data area. This configuration makes it possible to use the second data area as a dedicated transmission area. It is therefore possible to provide the optimal data transfer control device for a second-layer device in which no large amounts of data flow in the direction from the self node to another node.

In the present invention, data transfer may be in accordance with the IEEE 1394 standard.

According to a still further aspect of the present invention, there is provided electronic equipment comprising: any one of the above-described data transfer control device; a device which performs given processing on data that has been received from another node through the data transfer control device and a bus; and a device which outputs or stores data that has been subjected to processing. Alternatively, According to yet further aspect of the present invention, there is provided electronic equipment comprising: any one of above-described data transfer control device; a device which performs given processing on data that is to be transferred to another node through the data transfer control device and a bus; and a device which takes in data to be subjected to processing.

These aspects of the present invention make it possible to increase the speeds of processing within the electronic equipment for outputting or storing data that has been transferred from another node, or of processing within the electronic equipment for transferring fetched data to another node. Since these aspects of the present invention also make it possible to reduce the size of the data transfer control device and also reduce the processing load on the firmware or the like, electronic equipment can be made less expensive and more compact.

BRIEF DESCRIPTION OF DRAWINGS

FIGS. 13A are 13B illustrate the transaction label.

FIG. 19 shows details of the configuration of the reception side.

FIG. 21 illustrates tags.

BEST MODE FOR CARRYING OUT THE INVENTION

Embodiments of this invention are described below with reference to the accompanying drawings.

1. IEEE 1394

The description first relates to an outline of IEEE 1394.

1.1 Outline

The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

IEEE 1394 provides for asynchronous transfer and isochronous transfer as packet transfer methods. In this case, asynchronous transfer is suitable for data transfers where reliability is required and isochronous transfer is suitable for transfers of data such as moving images and audio, where real-time capabilities are required.

1.2 Layer Structure

Figure 1:
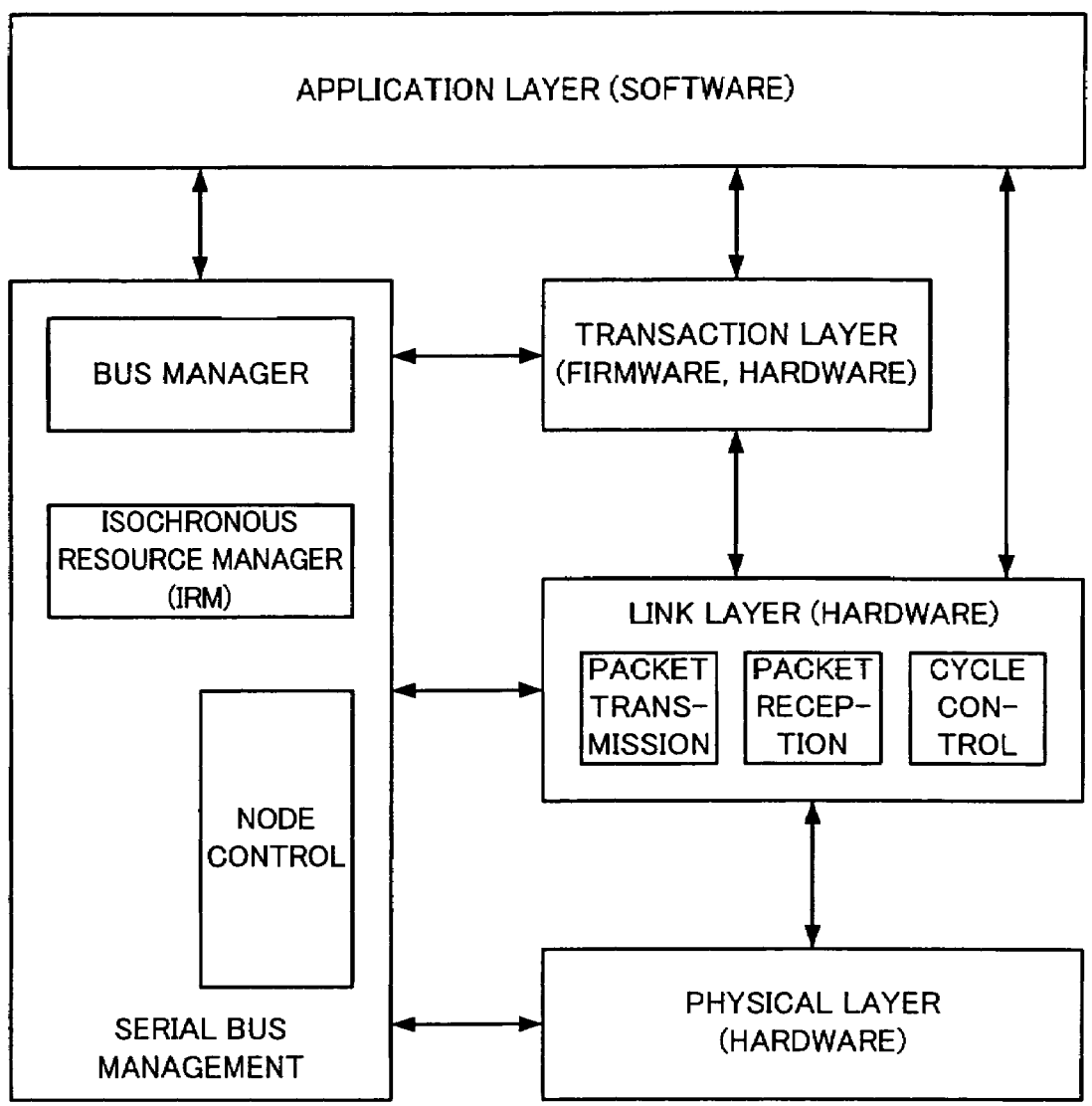
FIG. 1 shows the layer structure of IEEE 1394.

The layer structure (protocol structure) covered by IEEE 1394 is shown in FIG. 1.

The IEEE 1394 protocol is configured of a transaction layer, a link layer, and a physical layer. A serial bus management function monitors and controls the transaction layer, link, and physical layer, and provides various functions for controlling nodes and managing bus resources.

The transaction layer provides an interface (service) for transaction units within upper layers and a link layer for lower layers, and executes transactions such as read transactions, write transactions, and lock transactions.

In this case, a read transaction causes data to be transmitted from the responding node to the node that requested the data. Similarly, a write transaction causes data to be transmitted from the requesting node to the responding node. A lock transaction causes data to be transmitted from the requesting node to the responding node, and the responding node then processes that data and returns it to the requesting node.

Figure 2A:
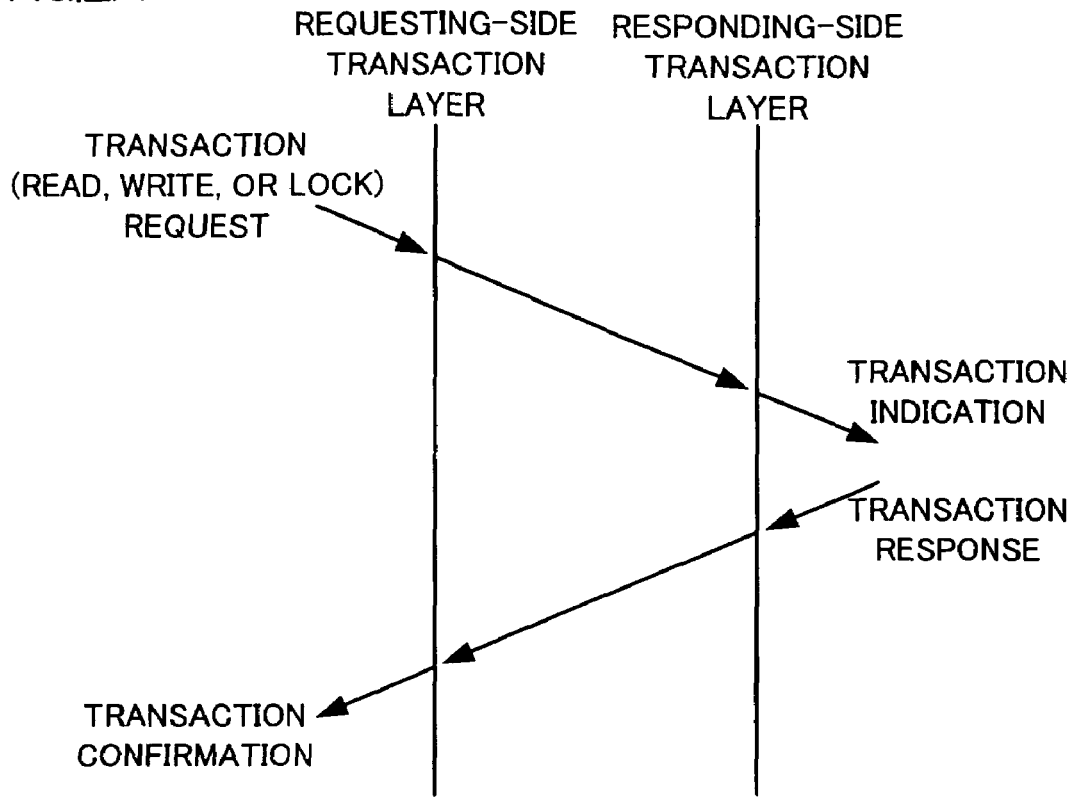
FIGS. 2A and 2B illustrate the various services provided by the transaction layer and the link layer.

The services provided by the transaction layer are configured of four services (request, indication, response, and confirmation), as shown in FIG. 2A.

In this case, a transaction request is a service that causes the requesting side to start a transaction, and a transaction indication is a service that informs the responding side that a request has been reported. A transaction response is a service that returns the state or data of the responding side to the requesting side, and a transaction confirmation is a service that informs the requesting side that a response has arrived from the responding side.

The link layer provides functions such as addressing, data check, data framing for packet transmission/reception, and cycle control for isochronous transfer.

Figure 2B:
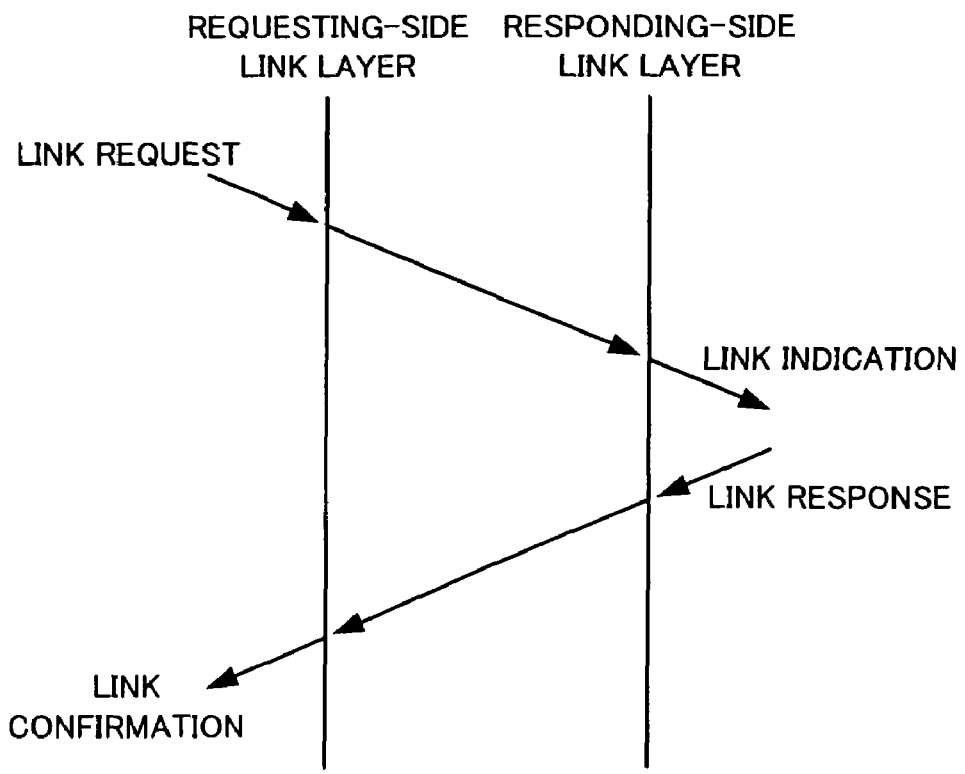

The services provided by the link layer are configured of four services (request, indication, response, and confirmation), as shown in FIG. 2B.

In this case, a link request is a service that transfers a packet to the responding side and a link indication is a service that receives a packet from the responding side. A link response is a service that transfers an acknowledgment from the responding side and a link confirmation is a service that receives an acknowledgment from the requesting side.

The physical layer converts the logical symbols used by the link layer into electrical signals, performs bus arbitration, and defines the physical bus interface.

The physical layer and link layer are usually implemented by hardware such as a data transfer control device (interface chip). The transaction layer is implemented either by firmware (processing means) operating on the CPU, or hardware.

Figure 3:
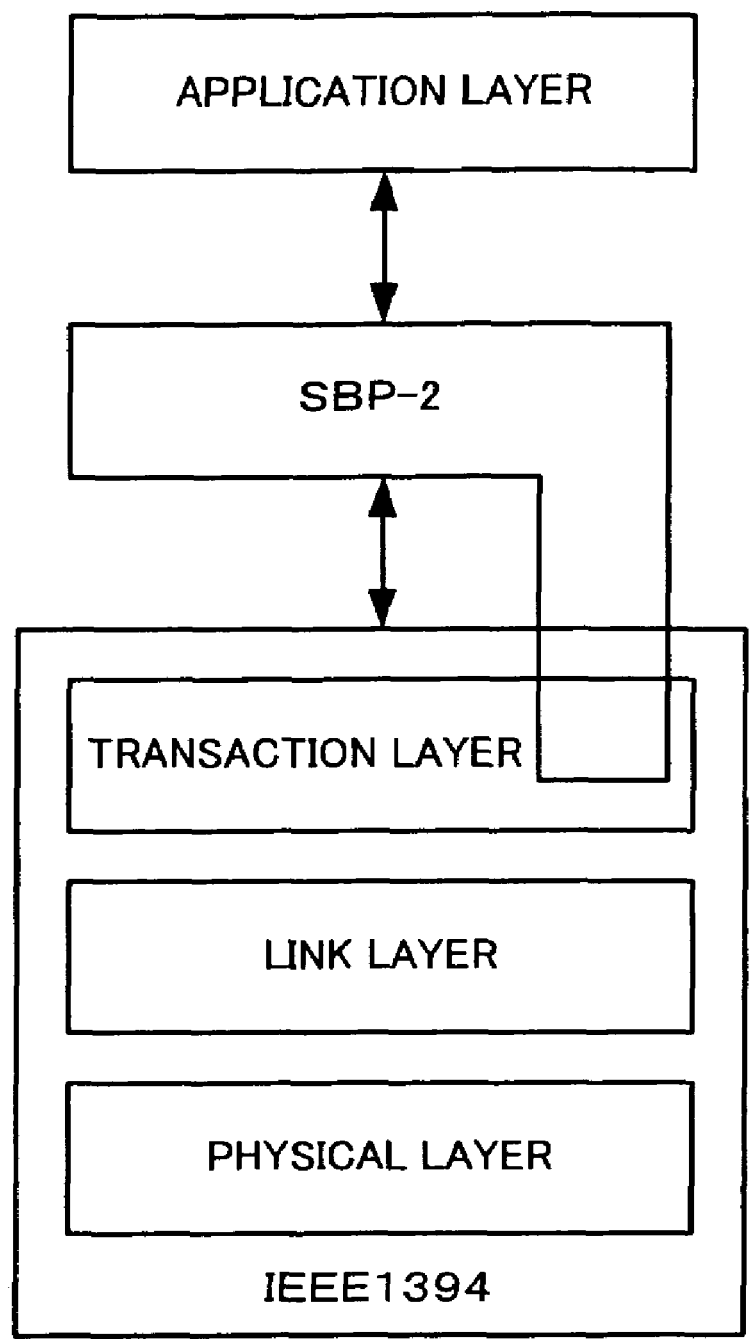
FIG. 3 illustrates the SBP-2.

Note that a protocol called the serial bus protocol 2 (SBP-2) has been proposed as a higher-order protocol that comprises some of the functions of the transaction layer under IEEE 1394, as shown in FIG. 3.

In this case, SBP-2 is proposed in order to enable utilization of the SCSI command set on top of the IEEE 1394 protocol. Use of this SBP-2 minimizes the changes to be made to the SCSI command set that is used in electronic equipment that conforms to the existing SCSI standards, and also enables their use in electronic equipment that conforms to the IEEE 1394 standard. The design and development of electronic equipment can be simplified thereby. Since it is also possible to encapsulate device-specific commands, not just SCSI commands, this greatly increases the universality of the command set.

With SBP-2, log-in processing is done by first using an operation request block (ORB) for initializing a log-in or fetch agent, which is created by an initiator (such as a personal computer). The initiator then creates an ORB (command block ORB) comprising a command (such as a read command and write command), then informs the target of the address of the thus created ORB. The target acquires the ORB created by the initiator by fetching from that address. If the command within the ORB was a read command, the target executes a block write transaction to transmit data from the target to the data buffer (memory) of the initiator. If the command within the ORB was a write command, on the other hand, the target executes a block read transaction to receive data from the data buffer of the initiator.

With this SBP-2, the target can execute a transaction to send or receive data when its own circumstances allow. Since it is therefore not necessary for the initiator and the target to operate in synchronism, the efficiency of data transfer can be increased.

Note that protocols other than SBP-2 are also being proposed as protocols of a higher order than IEEE 1394, such as the function control protocol (FCP).

2. Overall Configuration

The overall configuration of the data transfer control device in accordance with this embodiment of the invention is described below, with reference to FIG. 4.

Figure 4:
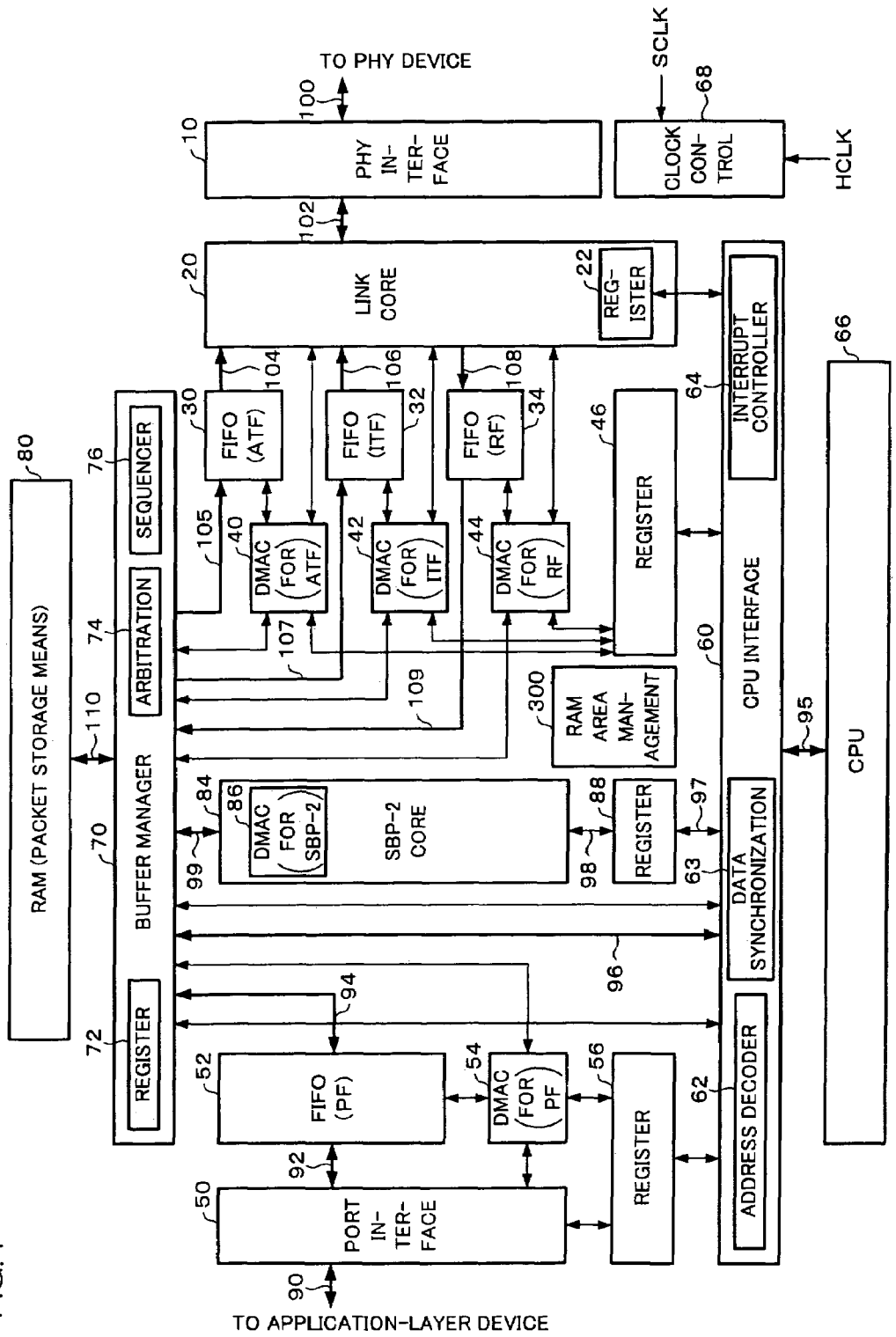
FIG. 4 shows an example of the configuration of a data transfer control device in accordance with an embodiment of this invention.

In FIG. 4, a PHY interface 10 is a circuit that provides an interface with a PHY device (a physical-layer device).

A link core 20 (link means) is a circuit implemented in hardware that provides part of the link layer protocol and the transaction layer protocol; it provides various services relating to packet transfer between nodes. A register 22 is provided for controlling the link core 20 that implements these protocols.

A FIFO (ATF) 30, FIFO (ITF) 32, and FIFO (RF) 34 are FIFOs for asynchronous transmission, isochronous transmission, and reception, respectively; each being configured of hardware means such as registers or semiconductor memory. In this embodiment of the invention, these FIFOs 30, 32, and 34 have an extremely small number of stages. For example, the number of stages per FIFO can be no more than three, or no more than two.

A DMAC 40 (read means), a DMAC 42 (read means), and a DMAC 44 (write means) are DMA controllers for ATF, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with an application-layer device (such as a device for performing print processing for a printer, by way of example). In this embodiment of the invention, the use of this port interface 50 makes it possible to transfer 8-bit data, for example.

A FIFO (PF) 52 is a FIFO used for transferring data between an application-layer device and a DMAC 54 is a DMA controller for PF. A register 56 provides control over the port interface 50 and the DMAC 54.

An SBP-2 core 84 is a circuit that implements part of the SBP-2 protocol by hardware. A register 88 provides control over the SBP-2 core 84. A DMAC (for SBP-2) 86 is a DMA controller for the SBP-2 core 84.

A RAM area management circuit 300 is a circuit for managing the various areas within the RAM 80. When each of the areas within the RAM 80 becomes full or empty, the RAM area management circuit 300 uses various full or empty signals to control the DMACs 40, 42, 44, 54, and 86.

A CPU interface 60 provides an interface with the CPU 66 that controls the data transfer control device. The CPU interface 60 comprises an address decoder 62, a data synchronization circuit 63, and an interrupt controller 64. A clock control circuit 68 controls the clock signals used by this embodiment, and SCLK that is sent from the PHY device (PHY chip) and HCLK, which is the master clock, are input thereto.

A buffer manager 70 is a circuit that manages the interface with the RAM 80. The buffer manager 70 comprises a register 72 for controlling the buffer manager, an arbitration circuit 74 that arbitrates the bus connection to the RAM 80, and a sequencer 76 that generates various control signals.

The RAM 80 functions as a randomly accessible packet storage means, where this function is implemented by SRAM, SDRAM, or DRAM or the like.

Note that the RAM 80 can be accommodated within the data transfer control device of this embodiment of the invention, but it is possible to attach part or all of the RAM 80 externally.

Figure 5:
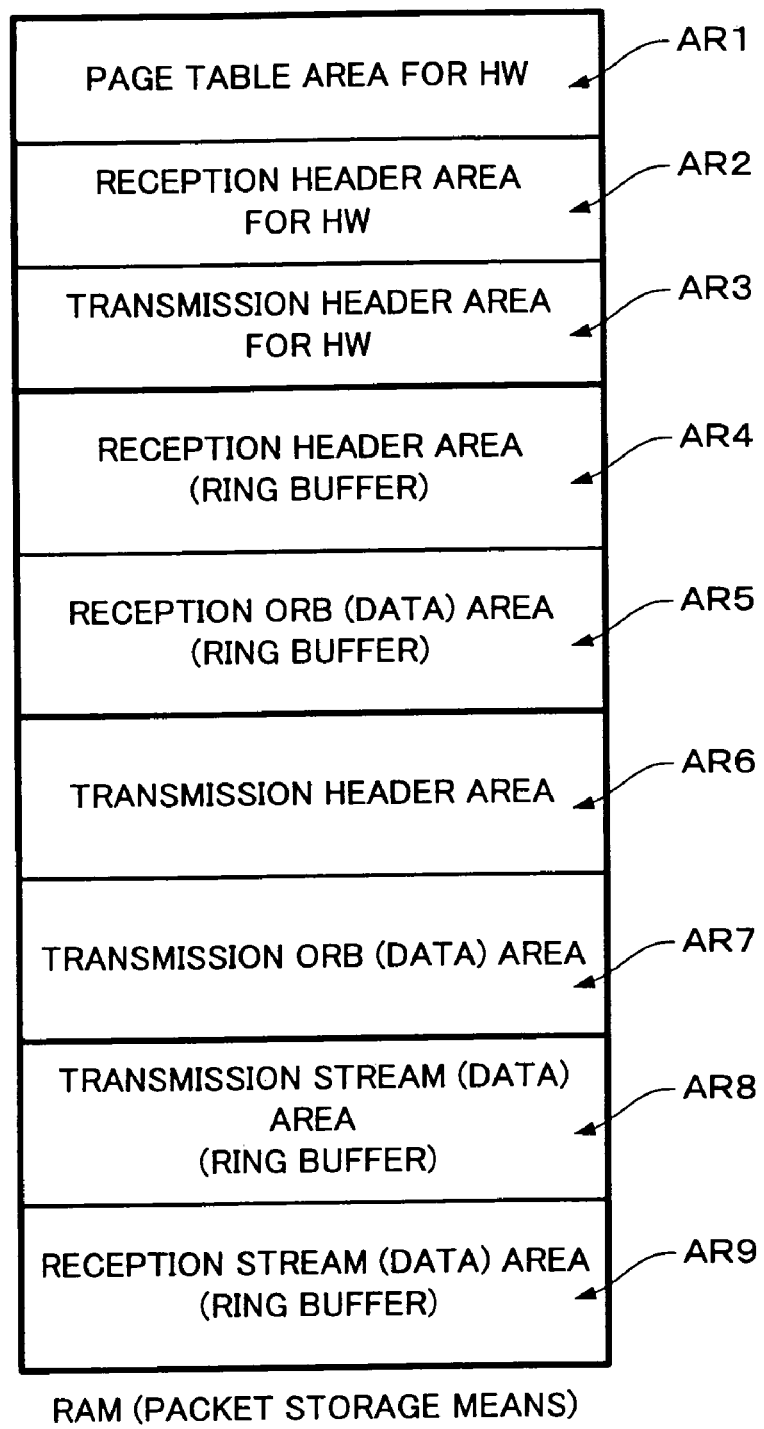
FIG. 5 illustrates a technique of separating (dividing) within a RAM (packet storage means).

An example of the memory map of the RAM 80 is shown in FIG. 5. In this embodiment of the invention as shown in FIG. 5, the RAM 80 is divided into header areas (AR2, AR3, AR4, and AR6) and data areas (AR5, AR7, AR8, and AR9). The header of a packet (broadly speaking, control information) is stored in a header area and the data (ORB and stream) is stored in a data area.

In this embodiment of the invention, the data areas (AR5, AR7, AR8, and AR9) in the RAM 80 are divided into ORB areas (AR5 and AR7) and stream areas (AR8 and AR9), as shown in FIG. 5.

In addition, the RAM 80 in this embodiment is divided into reception areas (AR2, AR4, AR5, and AR9) and transmission areas (AR3, AR6, AR7, and AR8).

Note that each ORB (first data for a first layer) is data (commands) conforming to SBP-2 as described above. A stream (second data for a second layer that is above the first layer) is data for the application layer (such as print data for a printer, read or write data for a CD-RW, or image data that has been fetched by a scanner).

A page table area for hardware (HW), a reception header area for HW, and a transmission header area for HW, denoted by AR1, AR2, and AR3, are areas used by the SBP-2 core 84 of FIG. 4 for writing and reading the page table, reception header, and transmission header.

Note that the areas denoted by AR4, AR5, AR8, and AR9 in FIG. 5 form a structure called a ring buffer.

A bus 90 (or buses 92 and 94) shown in FIG. 4 is for connections to applications (a first bus). Another bus 95 (or bus 96), which is for controlling the data transfer control device, is connected electrically to a device (such as a CPU) that controls the data transfer control device as a second bus. Yet another bus 100 (or buses 102, 104, 105, 106, 107, 108, and 109) is for electrical connections to physical-layer devices (such as a PHY device), as a third bus. A further bus 110 (a fourth bus) is for electrical connections to RAM that acts as a randomly accessible storage means. A still further bus 99 (a fifth bus) is for reading and writing header information and page table information, to enable the SBP-2 core 84 to implement SBP-2 by hardware.

The arbitration circuit 74 in the buffer manager 70 arbitrates bus access requests from the DMACs 40, 42, and 44, the CPU interface 60, and the DMACs 86 and 54. Based on the results of this arbitration, a data path is established between one of the buses 105, 107, 109, 96, 99, and 94 and the bus 110 of the RAM 80 (i.e., a data path is established between one of the first, second, third, and fifth buses and the fourth bus).

One feature of this embodiment of the present invention is the way in which it is provided with the RAM 80, which stores packets in a randomly accessible manner, and also the mutually independent buses 90, 96, 99, and 100 as well as the arbitration circuit 74 for connecting one of those buses to the bus 110 of the RAM 80.

Figure 6:
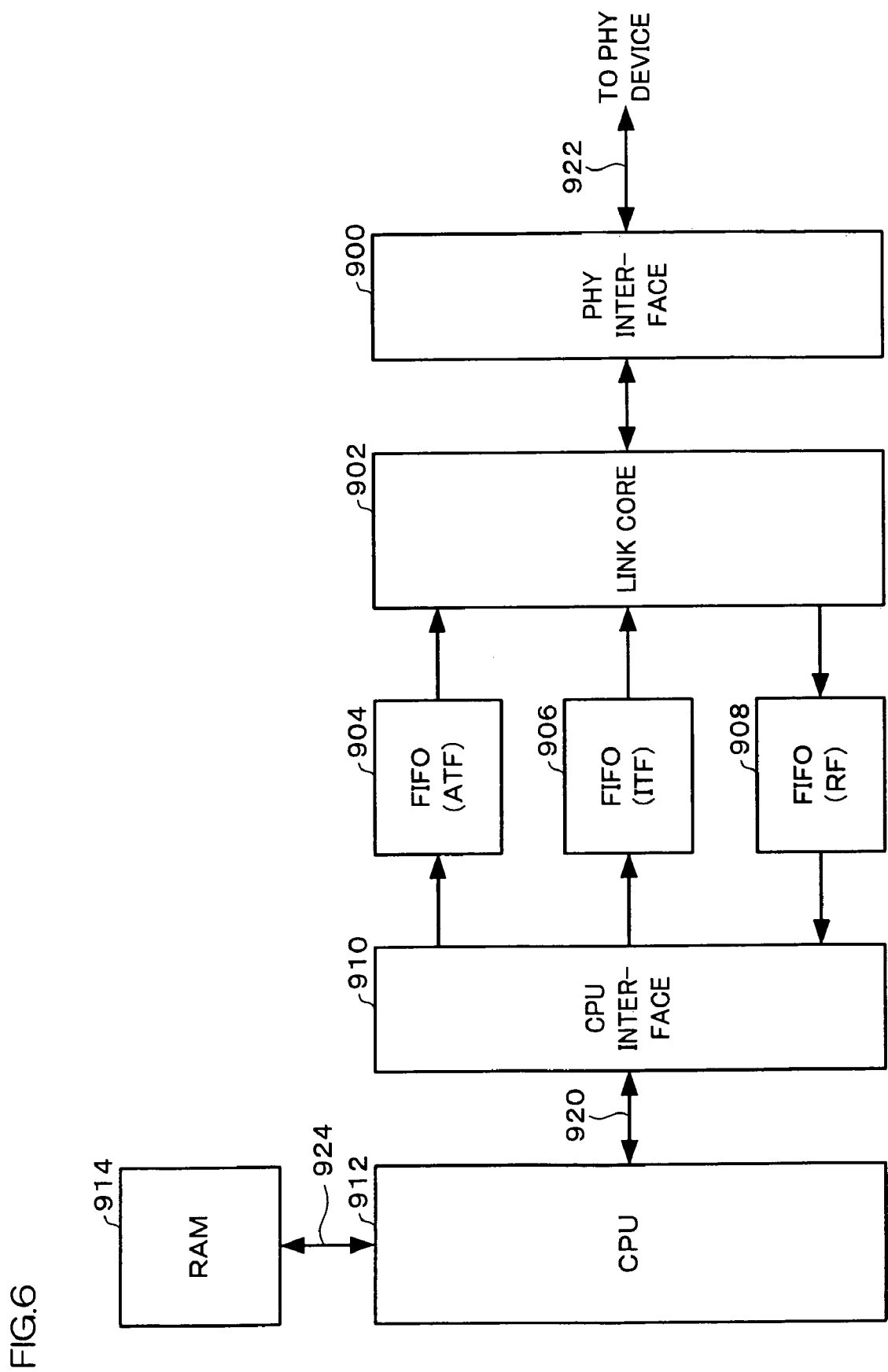
FIG. 6 shows the configuration of a comparative example.

A data transfer control device that has a different configuration from that of this embodiment is shown in FIG. 6, by way of example. In this data transfer control device, a link core 902 is connected to a PHY device by a PHY interface 900 and a bus 922. The link core 902 is connected to a CPU 912 by FIFOs 904, 906, and 908, a CPU interface 910, and a bus 920. The CPU 912 is also connected to a RAM 914, which is local memory in the CPU, by a bus 924.

The method of data transfer used with the data transfer control device configured as shown in FIG. 6 will now be described with reference to FIG. 7. A received packet sent from another node through a PHY device 930 passes through the bus 922, a data transfer control device 932, and the bus 920, then is accepted by the CPU 912. The CPU 912 temporarily writes the accepted received packet to the RAM 914 over the bus 924. The 912 then reads the received packet that has been written to the RAM 914 over the bus 924, processes the received packet into a form that can be used by the application layer, then transfers it to an application-layer device 934 over a bus 926.

When the application-layer device 934 transfers data, on the other hand, the CPU 912 writes this data to the RAM 914. A header is attached to the data in the RAM 914 to create a packet that conforms to IEEE 1394. The thus created packet is sent to another node over the path comprising the data transfer control device 932 and the PHY device 930.

Figure 7:
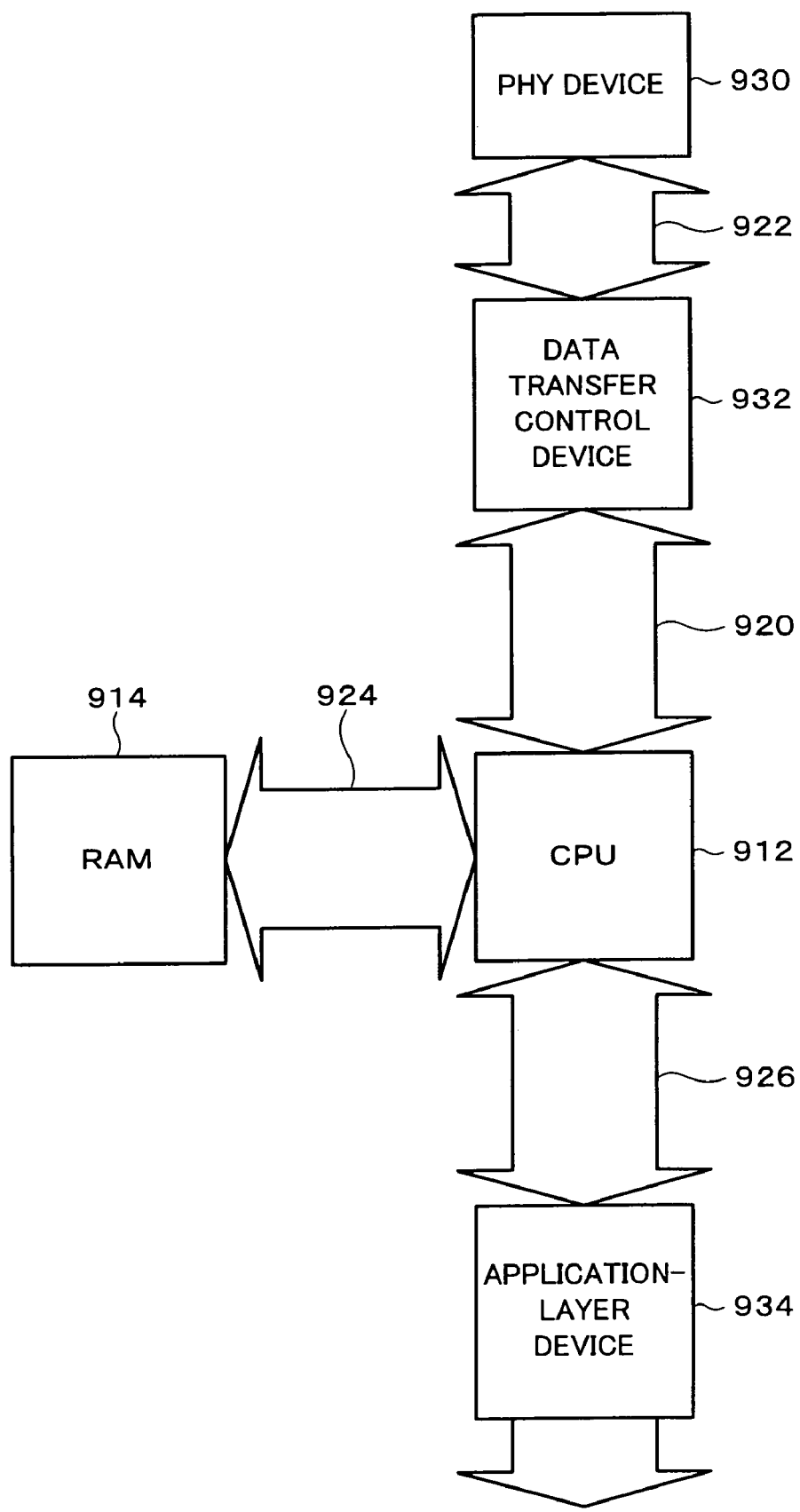
FIG. 7 illustrates the method of data transfer implemented by the configuration of FIG. 6.

However, if the data transfer method of FIG. 7 is employed, the processing load on the CPU 912 is extremely heavy. This means that, even if there is a fast transfer speed over the serial bus that connects nodes, the actual transfer speed of the entire system is slowed by factors such as processing overheads of the CPU 912, so that it is ultimately not possible to implement high-speed data transfer.

Figure 8:
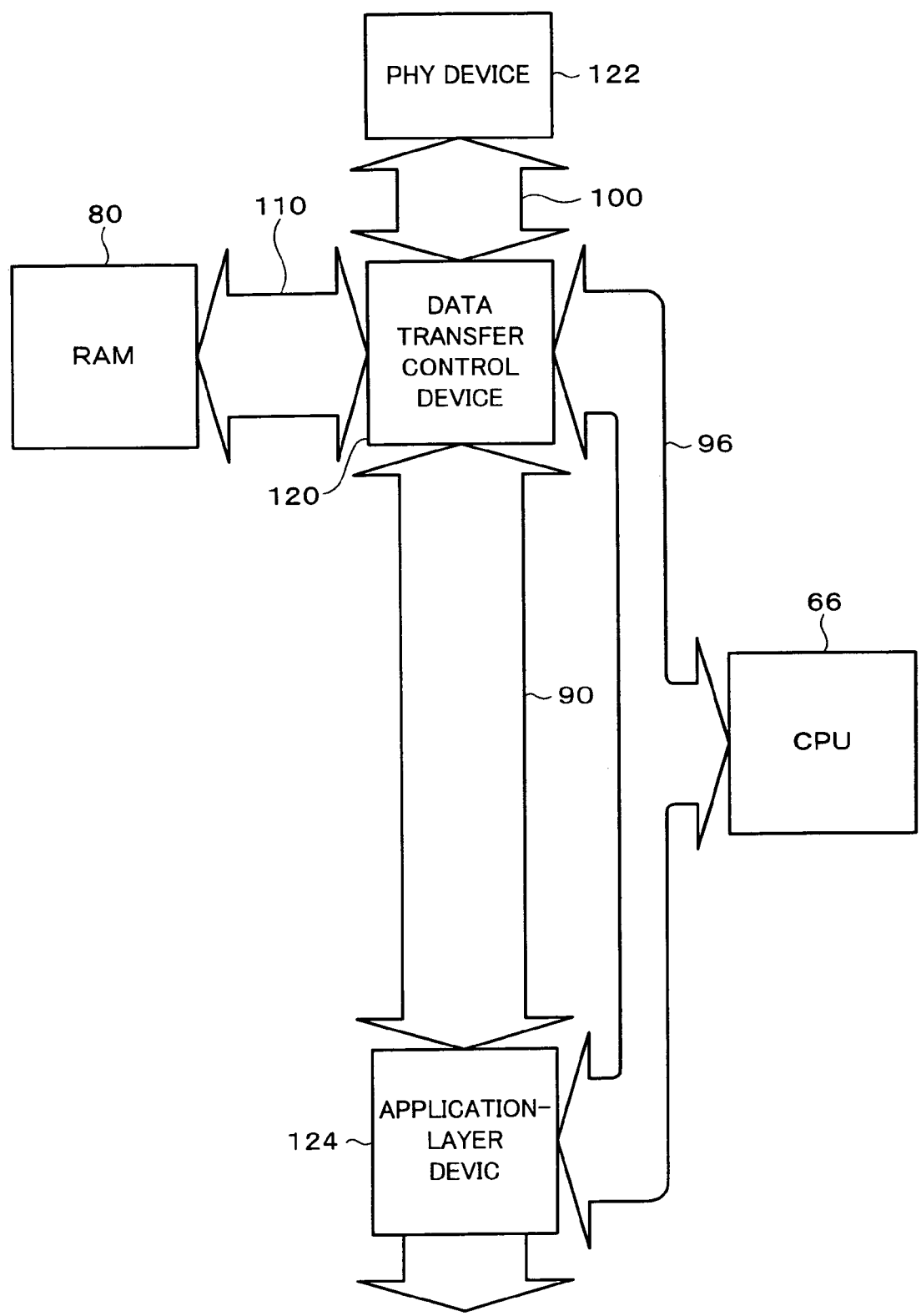
FIG. 8 illustrates the method of data transfer of this embodiment of the present invention.

In contrast thereto, this embodiment of the invention ensures that the bus 90 between a data transfer control device 120 and an application-layer device 124; the CPU bus 96; and the bus 110 between the data transfer control device 120 and the RAM 80 are mutually separated, as shown in FIG. 8. The configuration is therefore such that the CPU bus 96 can be used solely for controlling data transfer. The bus 90 is also dedicated so that it can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Characteristics of this Embodiment 3.1 Data Area Division (Division into ORB and Stream Areas)

A first characteristic of this embodiment of the present invention lies in the way the RAM 80 of FIG. 4 is divided into header areas (AR2, AR3, AR4, and AR6) and data areas (AR5, AR7, AR8, and AR9), and also the data areas are divided into ORB areas (AR5 and AR7) and stream areas (AR8 and AR9).

In other words, the division of the RAM into header and data areas enables the firmware to read headers sequentially from the header areas or write headers sequentially to the header areas. This has an advantage in that the processing load on the firmware can thus be reduced by a certain amount. However, it has become clear that dividing the RAM into just header areas and data areas is insufficient from the viewpoint of further increasing the speed of data transfer.

Figure 9:
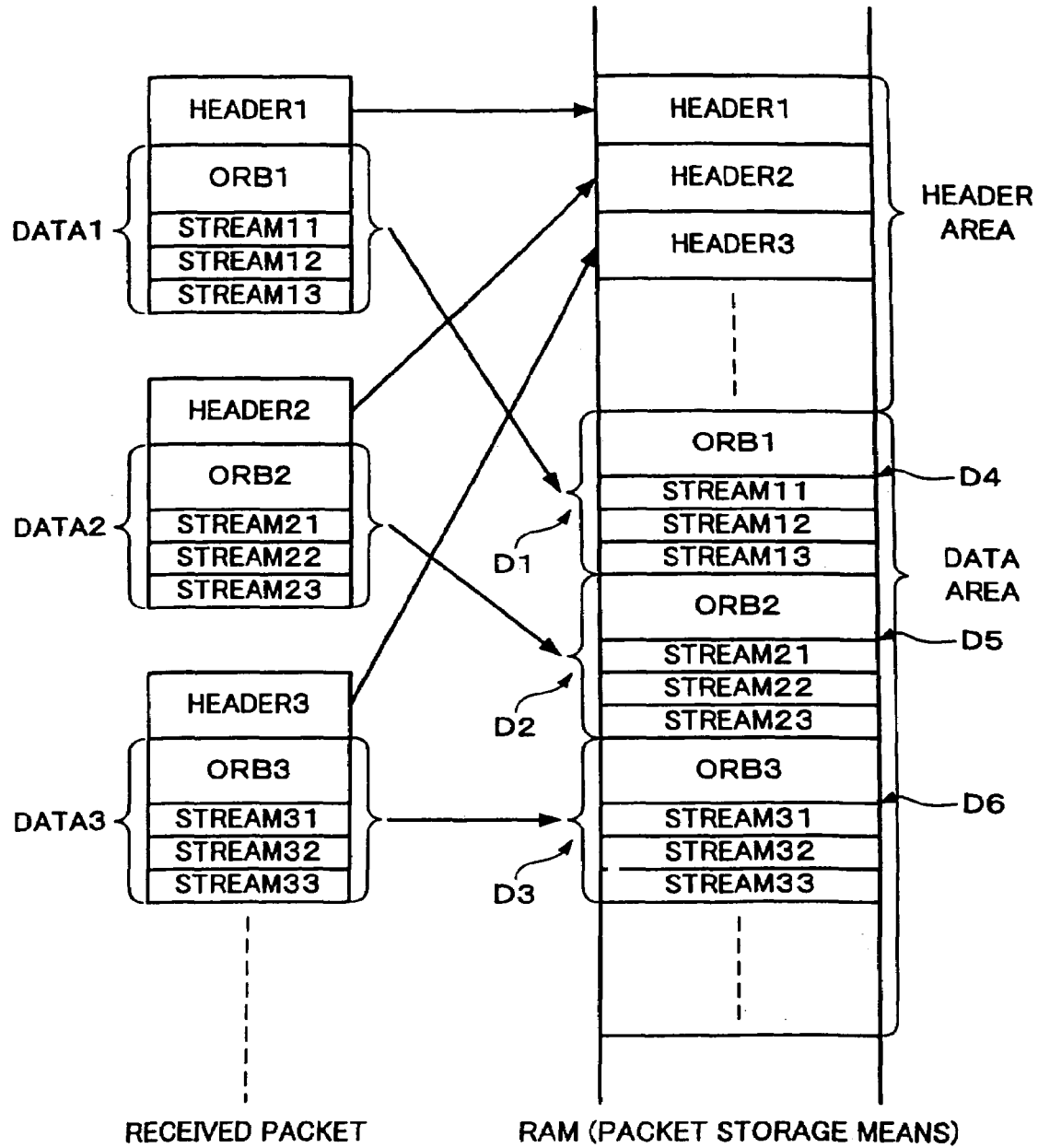
FIG. 9 illustrates a method of not dividing the data areas into ORB areas and stream areas.

As shown in FIG. 9, for example, received packets are divided into headers and data, with headers 1, 2, and 3 written to header areas and data 1, 2, and 3 written to data areas.

In such a case, the data consists of ORBs for the SBP-2 (first layer) and streams for the application layer (second layer) that is an upper layer, as previously described. With the header and data areas in RAM being simply separated, the ORBs and streams will therefore become mixed in the data areas, as shown at D1, D2, and D3 in FIG. 9.

For that reason, the processing described below is necessary when transferring streams of data from RAM to an application-layer device. First of all, the data pointer is set to the D4 position and streams 11, 12, and 13 are read out, then the data pointer is changed to the D5 position and streams 21, 22, and 23 are read out. The data pointer is subsequently changed to the D6 position and streams 31, 32, and 33 are read out.

Simply separating the RAM into header and data areas in this fashion makes it necessary for the firmware to control the read addresses during the transfer of streams to the application-layer device, so that the processing load on the firmware cannot be reduced significantly. In addition, it is not possible to read out the streams sequentially from the data areas, so the actual transfer speed of the data transfer control device cannot be increased significantly.

Figure 10:
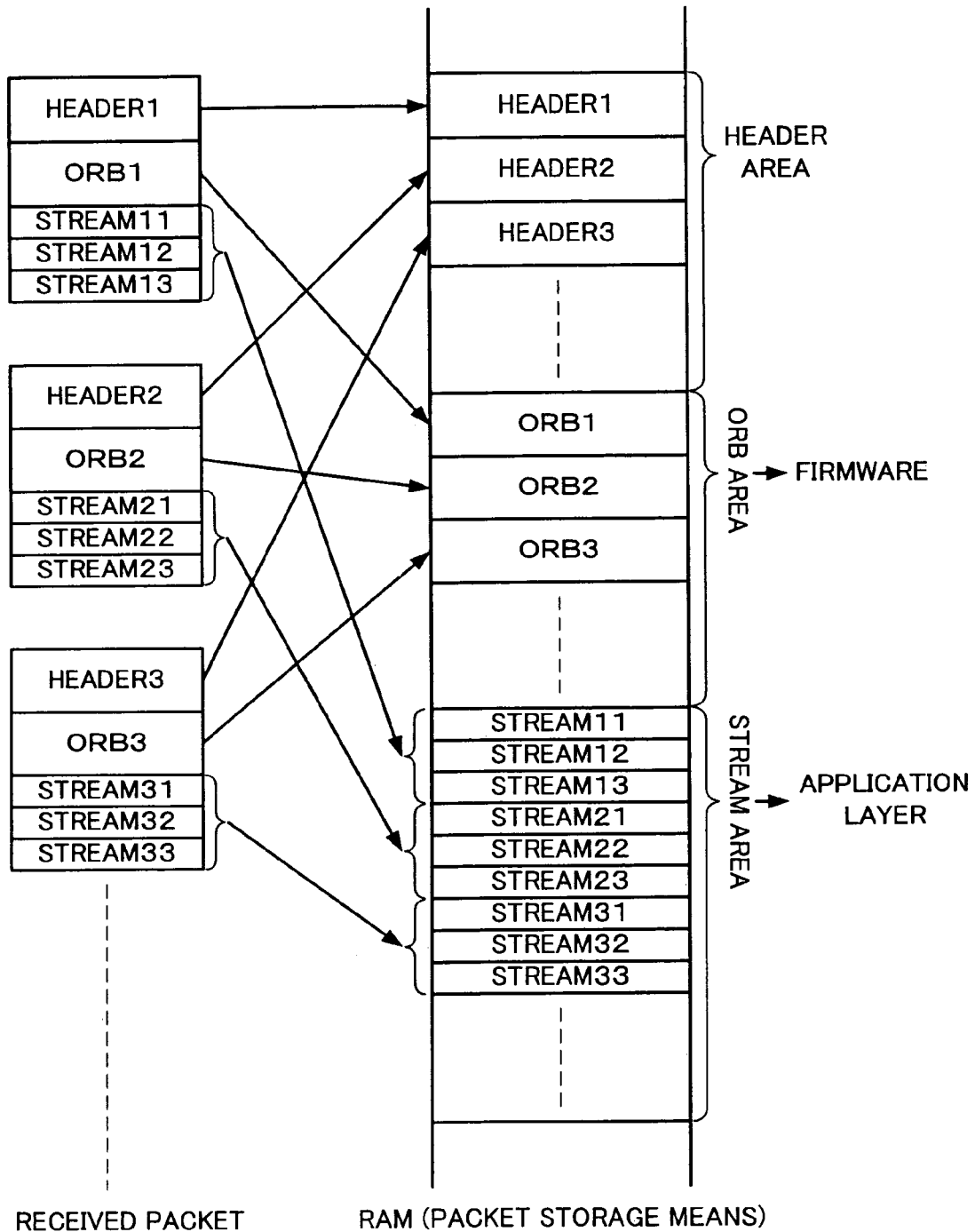
FIG. 10 is illustrative of a method of dividing the data areas into ORB areas and stream areas.
Figure 11:
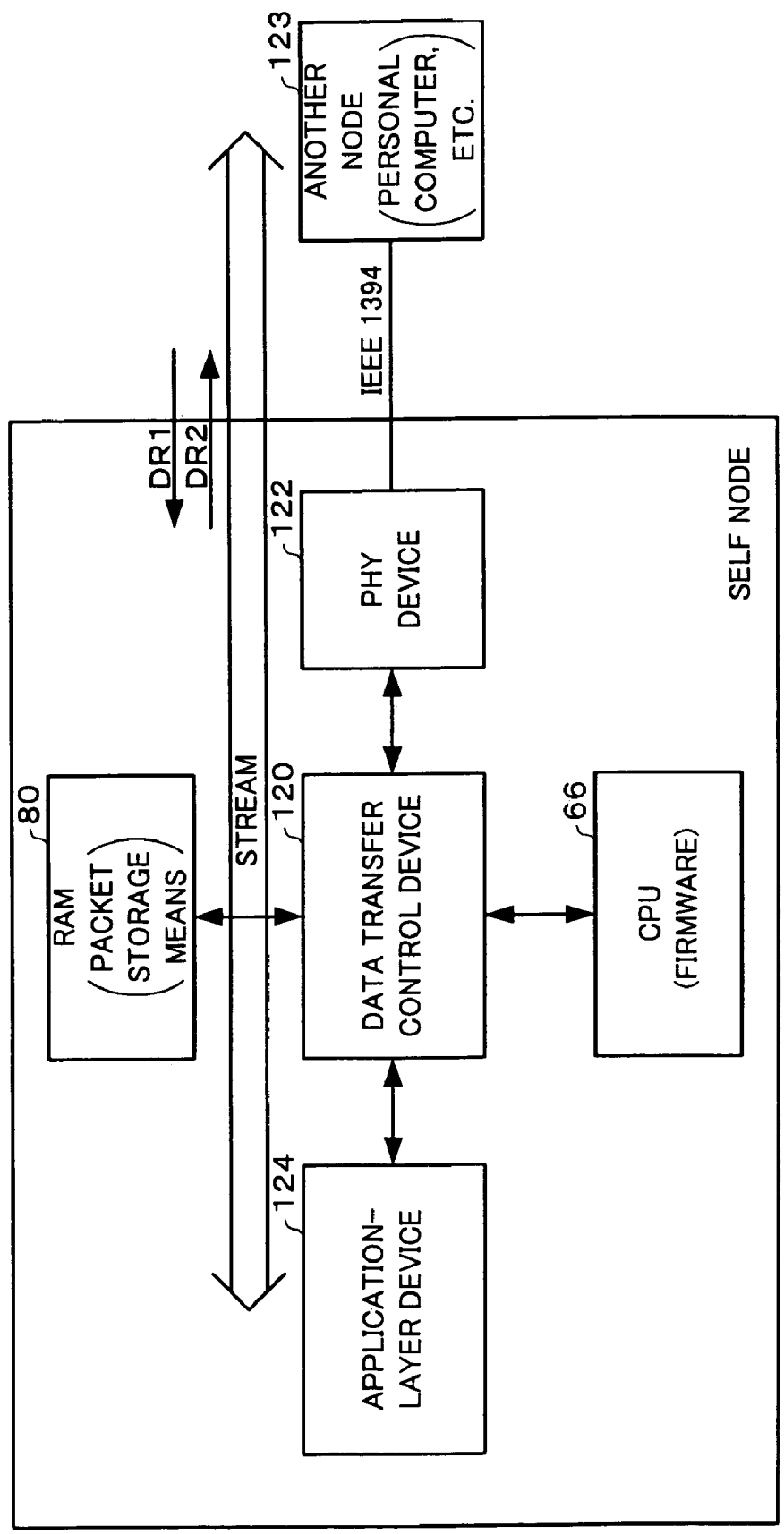
FIG. 11 shows the state of stream transfer between another node and an application-layer device.

On the other hand, the data area in FIG. 10 is divided into ORB areas and stream areas. Such a configuration makes it possible for the firmware (transaction layer) to read the ORBs 1, 2, and 3 sequentially from the ORB areas. In addition, it is possible to read out the streams 11 to 33 sequentially from the stream areas in RAM, without intervention from the firmware. In other words, it is possible to transfer streams (such as print data) between another node 123 (such as a personal computer) and an application-layer device (such as a device that processes print data for a printer), without the intervention of the firmware (CPU) 66, as shown in FIG. 11. As a result, the processing load on the firmware can be greatly reduced in comparison with the case shown in FIG. 9, and also the data transfer can be made far faster.

Note that FIG. 10 illustrates a case in which the data transfer control device 120 of this embodiment of the invention is receiving streams (a transfer of streams from another node 123 to the application-layer device 124 in a direction DR1. However, the data transfer speed can also be increased when the data transfer control device 120 is transmitting streams (when the transfer is from the application-layer device 124 to another node 123 in a direction DR2), by dividing the data area into a transmission ORB area (AR7 in FIG. 5) and a transmission stream area (AR8).

The division of the data areas into ORB areas and stream areas has the effects described below.

Figure 12:
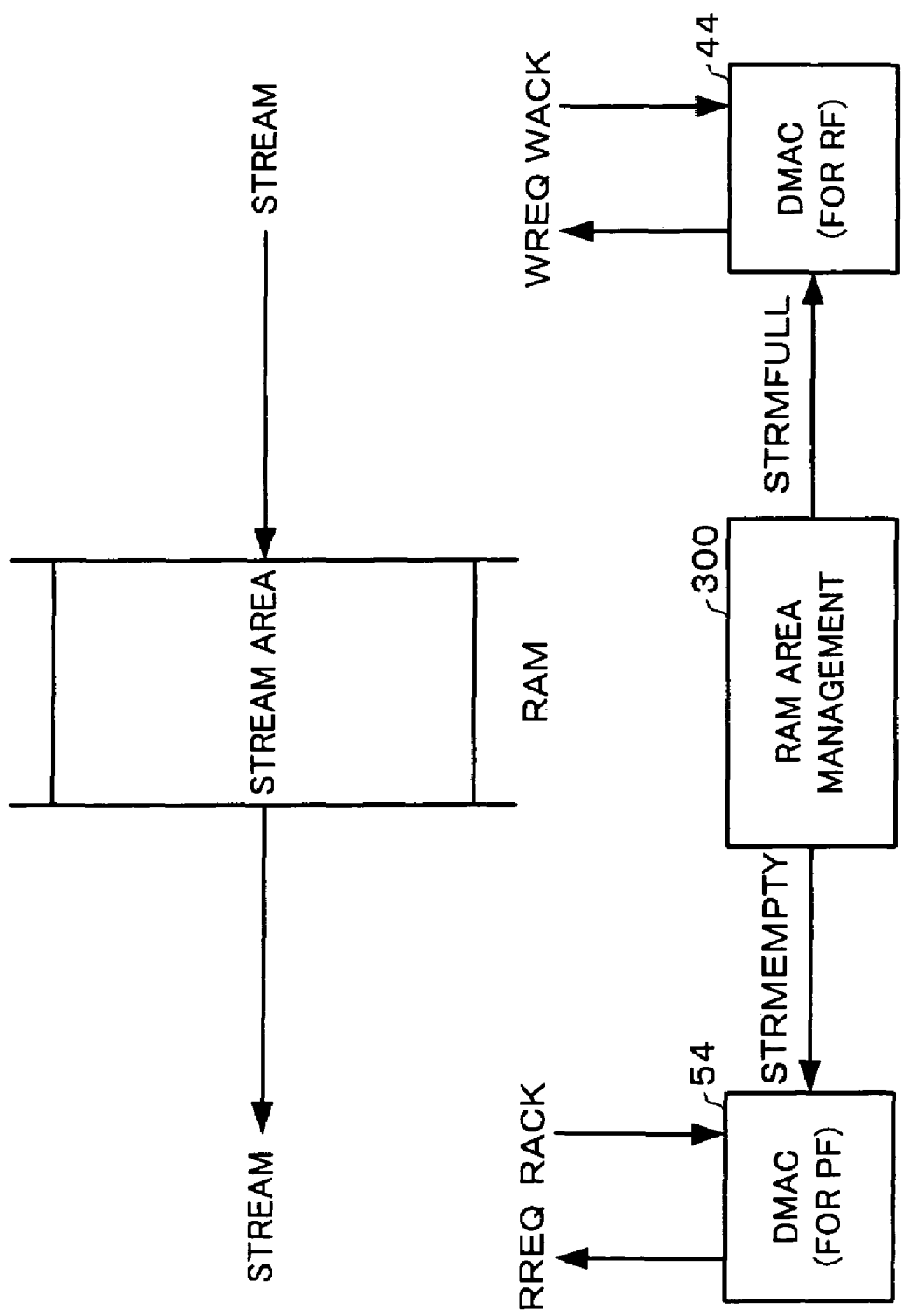
FIG. 12 illustrates a method of managing a stream area by using an empty signal and a full signal.

The RAM area management circuit 300 manages the stream areas as shown in FIG. 12, by way of example. More specifically, if a large number of streams are written to the stream areas so that the stream areas become full, the RAM area management circuit 300 makes a signal STRMFULL go active. When that happens, the DMAC 44 (write means) does not make the write request WREQ to RAM become active when it receives this STRMFULL. This ensures that streams are not written to the stream areas.

When a large number of streams are read from the stream areas so that the stream areas become empty, on the other hand, the RAM area management circuit 300 makes a signal STRMEMPTY go active. When that happens, the DMAC 54 (read means) does not make the read request RREQ to RAM become active when it receives this STRMEMPTY This ensures that streams are not read from the stream area (streams are not transferred to the application-layer device).

Dividing the data areas into ORB areas and stream areas in this manner ensures that it is sufficient to provide simple control which ensures that writing to the stream areas is inhibited when the stream areas are full and reading therefrom is inhibited when they become empty. It is therefore possible to control the data transfer without intervention from the firmware. As a result, the processing load on the firmware can be reduced. Since data transfer is controlled by hardware with no intervention from the firmware, which has lower processing capabilities, it is possible to achieve a dramatic increase in data transfer speed.

3.2 Utilization of Transaction Label to Switch Write Areas

Under IEEE 1394, an object called a transaction label tl is used as information for identifying each transaction.

In other words, a transaction requesting node includes this transaction label tl within the request packet and sends it to the responding node. On receiving this request packet, the responding node includes the same tl in the response packet and sends it back to the requesting node. The requesting node can identify that this response packet is in response to a transaction requested by itself, by checking the tl within the returned response packet.

It is sufficient to ensure that the transaction label tl has a unique relationship with respect to the responding node. More specifically, if a requesting node L has issued a transaction with tl=N with respect to a responding node M, it is not possible for the requesting node L to issue another transaction with tl=N with respect to the responding node M while that transaction remains incomplete. In other words, each transaction is uniquely specified by the transaction label tl, a source ID, and a destination ID. Conversely, the transaction label tl can have any value and other nodes must be able to receive any value of tl, provided the above restriction is respected.

When the requesting node has sent a request packet and is waiting for a response packet, it is possible that the processing that is performed when the response packet arrives has already been determined. In this case, this embodiment of the invention uses the method described below for drawing attention to the nature of the transaction label tl.

When a request packet for starting a transaction is sent to the responding node, indication information indicating the processing to be performed when the response packet is returned is comprised within the transaction label tl (broadly speaking, transaction identification information) comprised within the request packet, as shown in FIG. 13A. The configuration is such that the processing corresponding to the indication information comprised within tl is executed when the response packet is received from the responding node.

This ensures that the processing corresponding to the indication information comprised within tl can be executed by the hardware when the response packet is returned, without involving the firmware. This enables a reduction in the processing load on the firmware, and also tends to increase data transfer speeds.

More specifically, when a response packet is received from the responding node in accordance with this embodiment of the invention, that response packet is stored in the area specified by the indication information comprised within tl.

In other words, bits 5 and 4 of the transaction label tl are reserved beforehand to express the indication information, as shown in FIG. 13B.

If the returned response packet is to be written to the hardware (HW) area, bit 5 of tl of the request packet is set to 1 for transmission to the responding node. If the returned response packet is to be written to the firmware (FW) area, on the other hand, bit 5 of tl of the request packet is set to 0 for transmission to the responding node.

If the returned response packet is to be written to the stream area, bit 4 of tl of the request packet is set to 1 for transmission to the responding node. If the returned response packet is to be written to the ORB area, bit 4 of tl of the request packet is set to 0 for transmission to the responding node.

Figure 14:
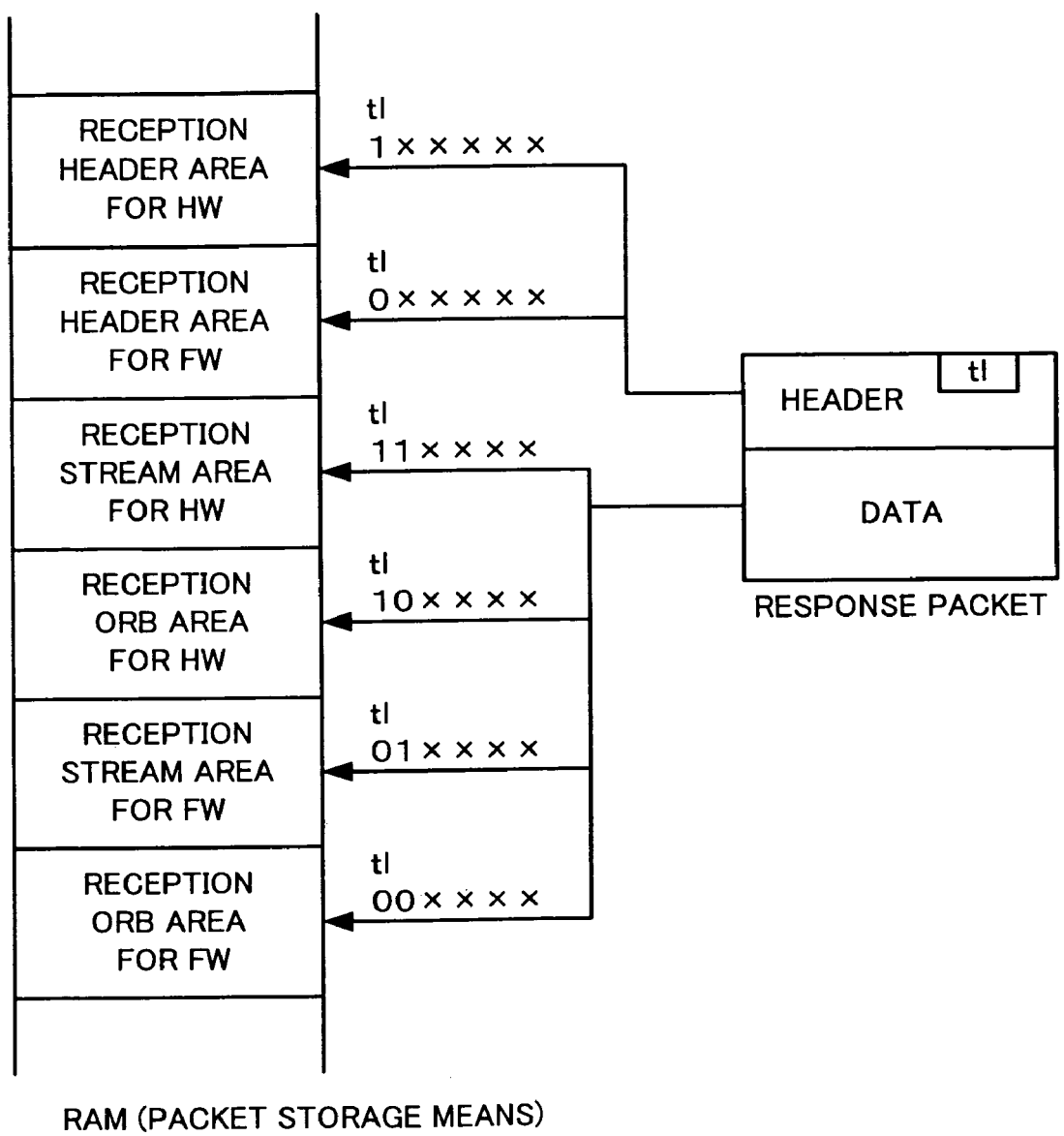
FIG. 14 illustrates a method of writing a header and data of a packet to different areas in RAM, using the transaction label.

This makes it possible to ensure that the header and data of the response packet are written to the corresponding areas shown in FIG. 14, when the response packet is returned.

In other words, if tl=1xxxxx (where "x" means "don't care"), the header of the response packet is written to the reception header area for HW, but if tl=0xxxxx, it is written to the reception header area for FW.

Similarly, if tl=11xxxx, the data of the response packet is written to the reception stream area for HW, but if tl=10xxxx, it is written to the reception ORB area for HW. If tl=01 xxxx, the data of the response packet is written to the reception stream area for FW, but if tl=00xxxx, it is written to the reception ORB area for FW.

This arrangement ensures that the header and data of a packet can be written automatically to the corresponding areas in RAM, without intervention from the firmware. The configuration of the hardware that writes the response packet into RAM can be simplified, leading to a reduction in the size of the data transfer control device.

As described with reference to FIG. 10, the writing of packet headers to the header areas, ORBs to the ORB areas, and streams to the stream areas can be done automatically, which reduces the processing load on the firmware and promotes faster data transfer.

Figure 15:
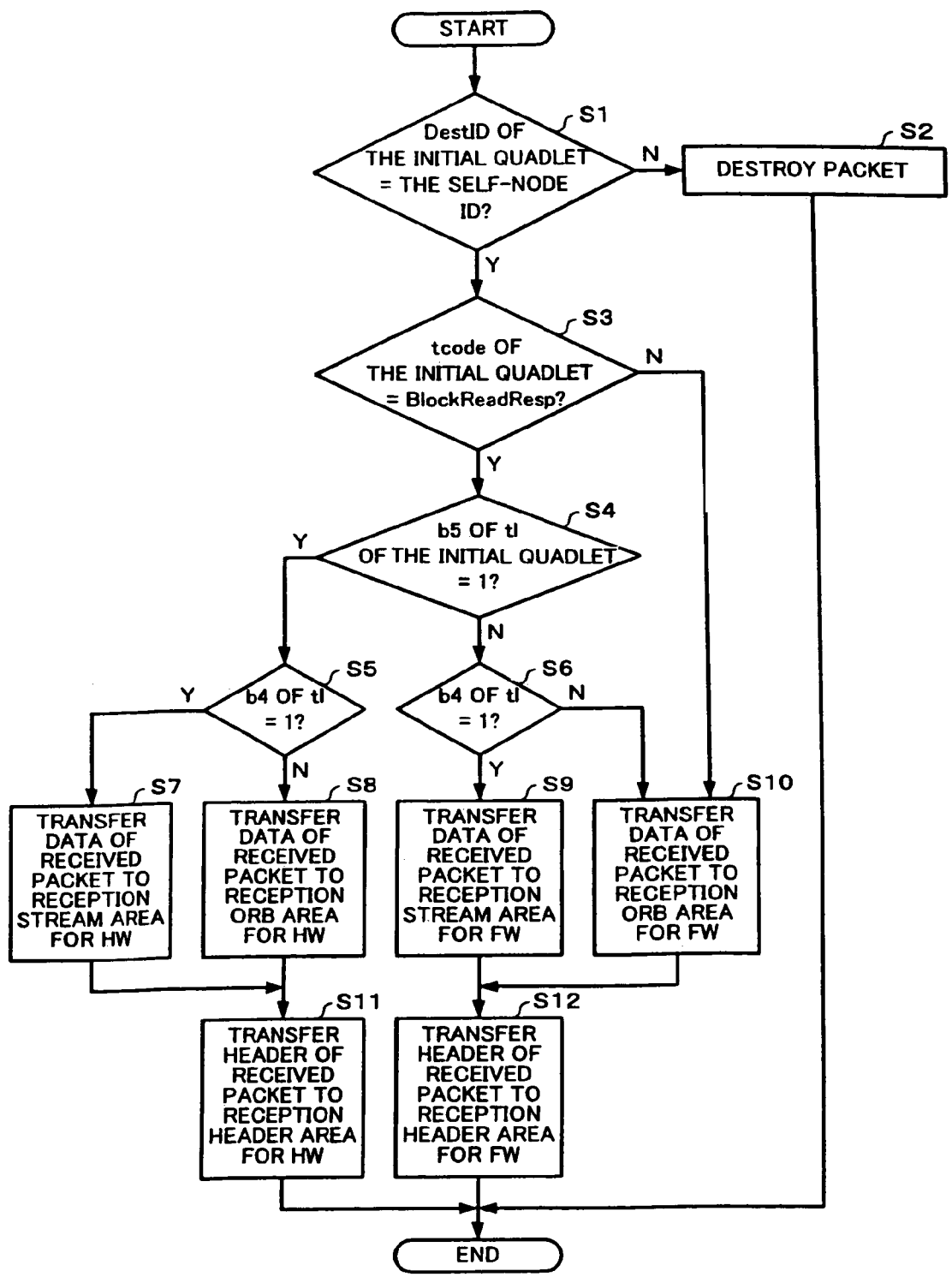
FIG. 15 illustrates details of the writing of the header and data of packets to areas in RAM, using transaction labels.

The description now turns to a detailed example of the processing for writing the headers and data of packets to various areas in RAM, based on the value of tl, with reference to FIG. 15.

The system first determines whether or not the destination ID comprised within the initial quadlet of a received packet matches the ID of the self node (step S1). If it is not a packet addressed to the self node, that packet is destroyed (step S2).

The system then checks the transaction code tcode comprised within the initial quadlet of the received packet to determine whether or not the received packet is a block/read/response packet (step S3). If the packet is not a block/read/response, the processing moves to step S10.

Bits 5 and 4 of the transaction label tl comprised within the initial quadlet of the received packet are then identified by steps S4, S5, and S6. If bits 5 and 4 are (1, 1), the flow branches to step S7; if they are (1, 0), it branches to step S8; if they are (0, 1), the flow branches to step S9; and if they are (0, 0), the flow branches to step S110.

The data of the received packet is transferred to the reception stream area for HW if the flow branched to step S7, to the reception ORB area for HW if the flow branched to step S8, to the reception stream area for FW if the flow branched to step S9, or to the reception ORB area for FW if the flow branched to step S10. The header of the received packet is transferred to the reception header area for HW (step S11) if bit 5 of tl is one, or to the reception header area for FW if bit 5 of tl is zero (step S12).

Note that if the received packet is determined by step S3 to not be a block/read/response packet, the flow branches to step S10. Most received packets that are not block/read/response packets are considered to be packets comprising commands, so it is considered appropriate to store such a command packet in the reception ORB area for FW and reception header area for FW, for processing by the firmware.

3.3 Division of Reception Stream Area and Transmission Stream Area

Figure 16:
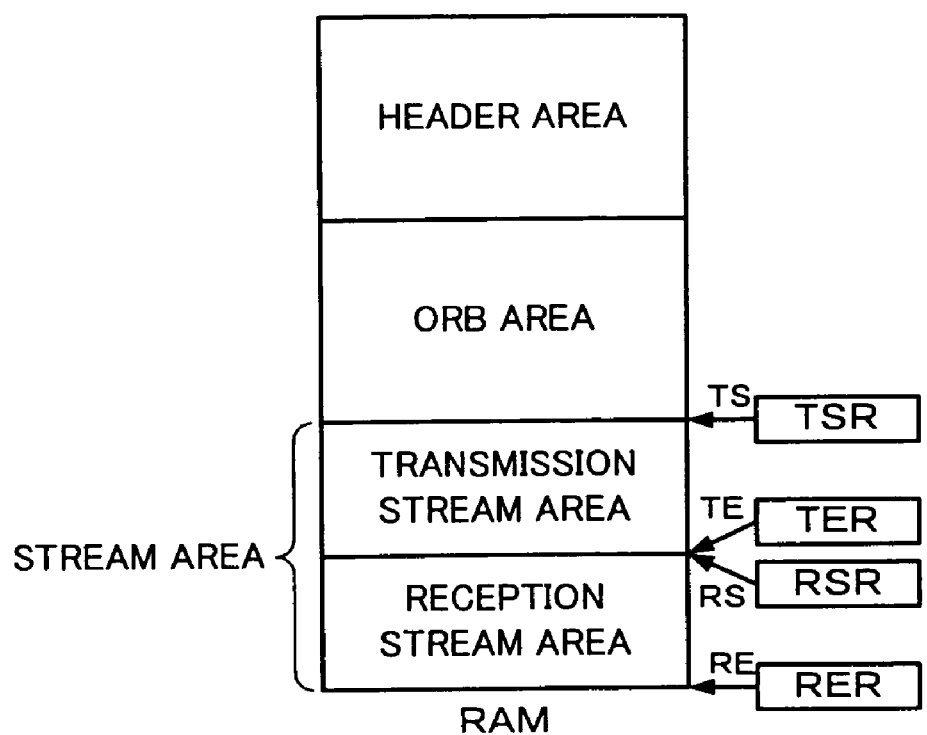
FIG. 16 illustrates a method of providing register TSR, TER, RSR, and RER for holding addresses TS and TE for reserving a transmission stream area and addresses RS and RE for reserving a reception stream area.

This embodiment of the present invention is provided with registers TSR (a first address storage means) and a TER (a second address storage means) for holding a transmission area start address TS and a transmission area end address TE used for reserving a transmission stream area within a stream area (a second data area), as shown in FIG. 16. Registers RSR (a third address storage means) and RER (a fourth address storage means) are also provided for holding a reception area start address RS and a reception area end address RE used for reserving a reception stream area within a stream area.

Note that the registers TSR, TER, RSR, and RER of this embodiment of the invention can be overwritten by the firmware (CPU). At least one of the registers TSR and RER in FIG. 16 could be configured to hold a fixed value so that it cannot be overwritten by the firmware.

The transmission stream area is positioned above the reception stream area in FIG. 16 but the transmission stream area could equally well be positioned below the reception stream area. In such a case, at least one of the registers RSR and TER could be configured to hold a fixed value so that it cannot be overwritten by the firmware.

The provision of the registers TSR, TER, RSR, and RER shown in FIG. 16 make it possible to reserve areas for each mode, as shown in FIGS. 17A, 17B, 17C, and 17D.

Figure 17A:
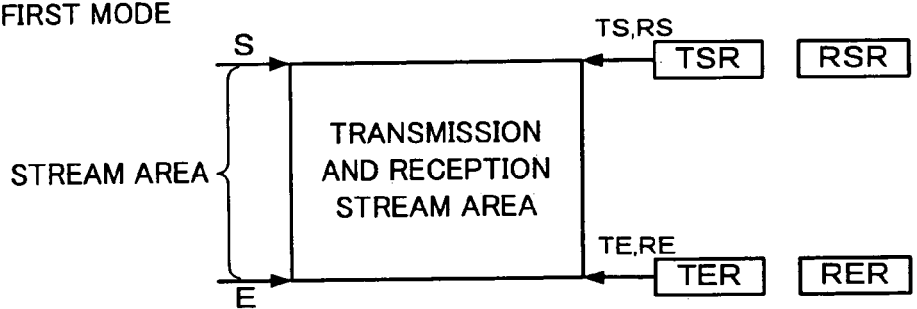
FIGS. 17A, 17B, 17C, and 17D illustrate various modes in which areas are reserved.

In a first mode, shown in FIG. 17A by way of example, the transmission area start address TS stored in the register TSR and the reception area start address RS stored in the register RSR are set to the start address S of the stream area. The transmission area end address TE stored in the register TER and the reception area end address RE stored in the register RER are set to the end address E of the stream area.

This first mode makes it possible to use the entire stream area for both reception and transmission.

Figure 17B:
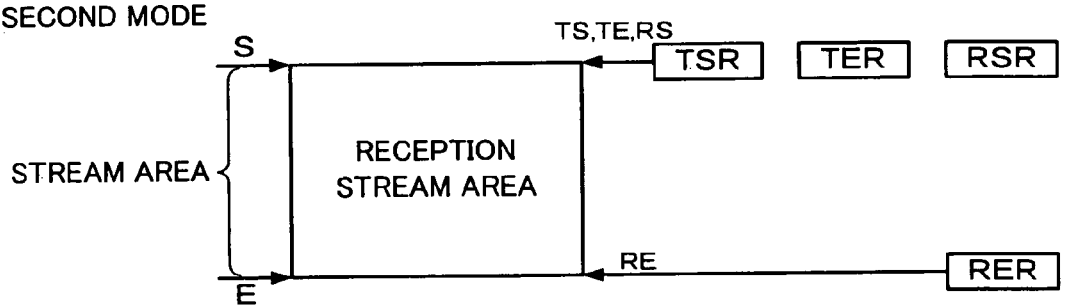

In a second mode shown in FIG. 17B, the transmission area start address TS, transmission area end address TE, and reception area start address RS are set to the start address S of the stream area and the reception area end address RE is set to the end address E of the stream area (TS and TE could also be set to E).

This second mode makes it possible to use the entire stream area as a reception stream area.

Figure 17C:
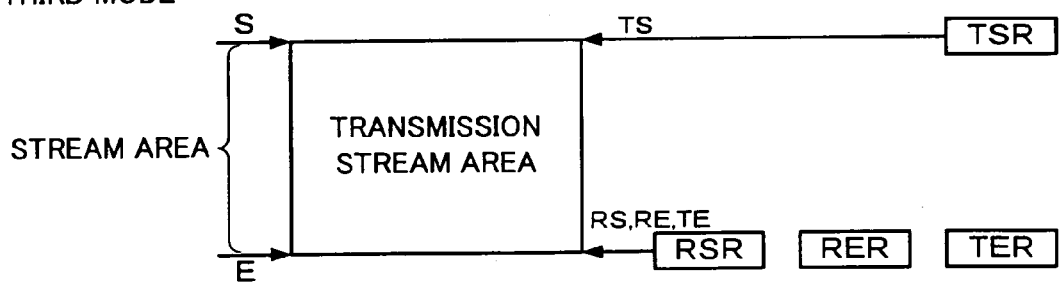

In a third mode shown in FIG. 17C, the transmission area start address TS is set to the start address S of the stream area and the reception area start address RS, reception area end address RE, and transmission area end address TE are set to the end address E of the stream area (RS and RE could also be set to S).

This third mode makes it possible to use the entire stream area as a transmission stream area.

Figure 17D:
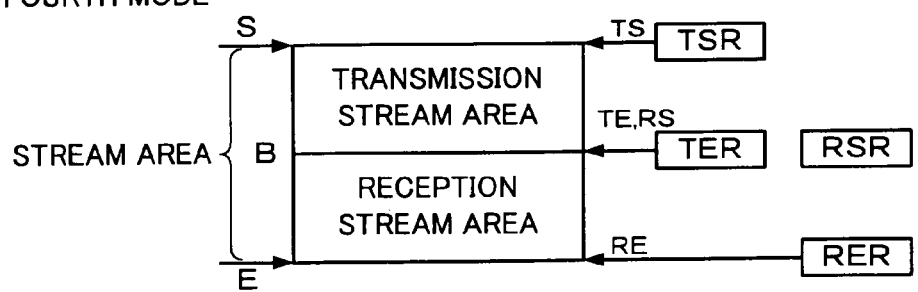

In a fourth mode shown in FIG. 17D, the transmission area start address TS is set to the start address S of the stream area, the transmission area end address TE and the reception area start address RS are set to a boundary address B of the stream area, and the reception area end address RE is set to the end address E of the stream area.

This fourth mode makes it possible to use part of the stream area in the transmission stream area and the other part thereof in the reception stream area.

In electronic equipment such as a CD-RW drive or hard disk drive, by way of example, streams are transferred in both the DR1 and DR2 directions shown in FIG. 11. It is also not usual for stream transfer in the DR1 direction and stream transfer in the DR2 direction to occur at the same time. Therefore, the first mode shown in FIG. 17A may be used to reserve the area in this case. This makes it possible to utilize RAM efficiently so that, if the storage capacity of the stream area is 4 kilobytes, by way of example, the entire 4 kilobytes of storage capacity can be reserved during transmission and during reception.

Figure 18:
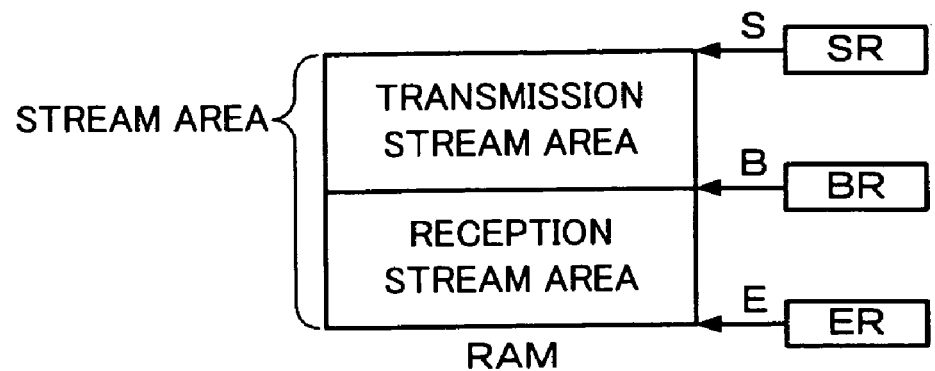
FIG. 18 illustrates an area-reserving method in accordance with a comparative example.

Note that since separate transmission and reception stream areas are reserved in the stream area in a comparative example shown in FIG. 18, the configuration is provided with a register SR for holding the start address S of the stream area, a register BR for holding the boundary address B of the stream area, and a register ER for holding the end address E of the stream area.

With this comparative example shown in FIG. 18, however, it is possible to set the stream area for the second, third, and fourth modes shown in FIGS. 17B, 17C, and 17D, but it is not possible to set it for the first mode of FIG. 17A. When such a data transfer control device is incorporated in a CD-RW drive or hard disk drive, therefore, the areas can only be reserved as shown in the fourth mode of FIG. 17D, which has a disadvantage in that the RAM is not used efficiently, as it is in the first mode shown in FIG. 17A.

With electronic equipment such as a printer, the stream is transferred in the direction DR1 shown in FIG. 11 (the data transfer control device receives the stream). In such a case, it is possible to reserve the area in the second mode of FIG. 17B, to set the entire area to be a reception stream area. With such a configuration, it is possible to use the entire stream area efficiently for transferring the stream.

Conversely, with electronic equipment such as a scanner or CD-ROM, the stream is transferred in the direction DR2 shown in FIG. 11 (the data transfer control device transmits the stream). In such a case, it is possible to reserve the area in the third mode of FIG. 17C, to set the entire area to be a transmission stream area. With such a configuration, it is possible to use the entire stream area efficiently for transferring the stream.

Note that, with electronic equipment that uses the stream area as cache memory, it is possible to reserve the area in the fourth mode shown in FIG. 17D.

4. Detailed Example 4.1 Detailed Configuration of Reception Side

The description now turns to details of the configuration of the reception side. An example of the detailed configuration of the link core 20 (link means), a FIFO 34, and the DMAC 44 (write means) is shown in FIG. 19.

The link core 20 comprises a bus monitor circuit 130, a serial-parallel conversion circuit 132, and a packet shaping (reforming) circuit 160.

The bus monitor circuit 130 in this case monitors an 8-bit wide data bus D and a 2-bit wide control bus CTL that are connected to a PHY device by the PHY interface 10.

The serial-parallel conversion circuit 132 converts the data on the data bus D into 32-bit data.

Figure 20A:
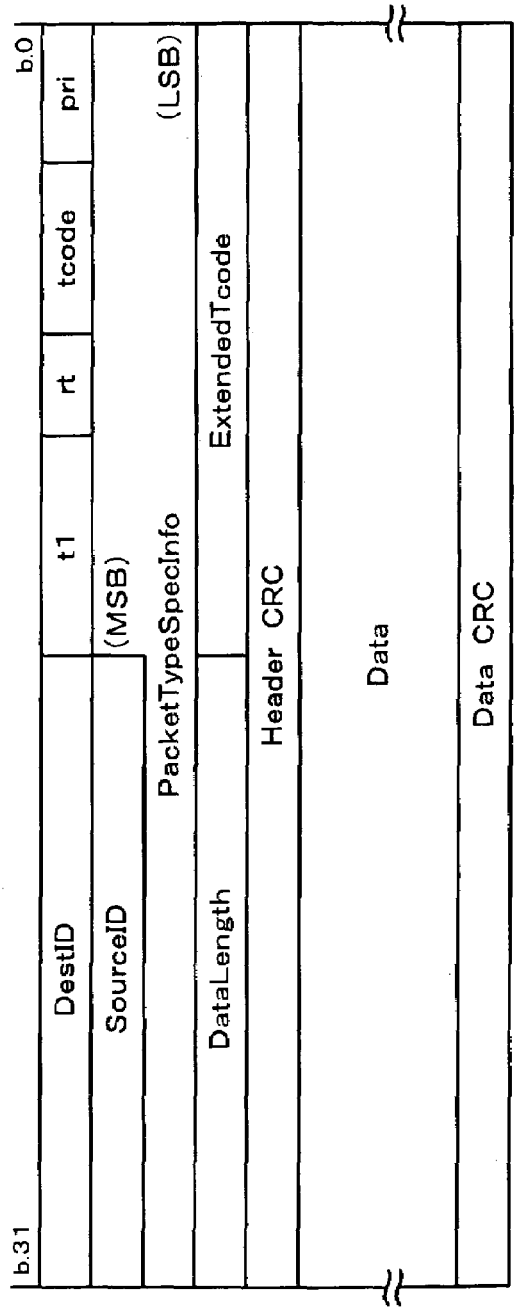
FIG. 20A shows the format of a packet having block data in asynchronous transfer in accordance with the IEEE 1394 standard and FIG. 20B shows the format of the header portion of a packet stored in RAM and having block data in asynchronous reception.
Figure 20B:
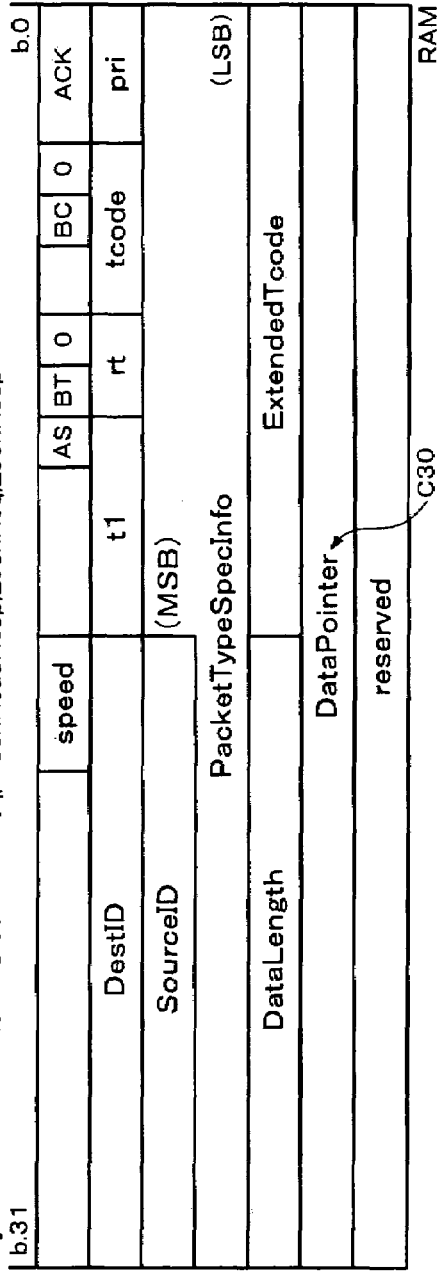

The packet shaping circuit 160 shapes (reforms) each packet that has been transferred in from another node, into a form that can be used by an upper layer. The format of a packet having block data in asynchronous transfer in accordance with the IEEE 1394 standard is shown in FIG. 20A by way of example. The format of a header portion (stored in the header area of the RAM 80) of a packet having block data in asynchronous reception is shown in FIG. 20B. The thus-configured embodiment of the present invention shapes a packet in the format shown in FIG. 20A into a packet of the format shown in FIG. 20B, so that it can be used by an upper layer such as the firmware.

The packet shaping circuit 160 comprises a packet check circuit 142, a sequencer 167, a buffer 168, and a selector 170; and the packet check circuit 142 comprises a tag generation circuit 162, a status generation circuit 164, and an error check circuit 166.

The packet check circuit 142 in this case is a circuit that diagnoses packets. The tag generation circuit 162 creates tags that are information for delimiting the header, data, and other parts of the packets, and the status generation circuit 164 creates various statuses to be added to the packets. The error check circuit 166 investigates error check information, such as parity information and CRCs, which are comprised within each packet, to detect any errors therein.

The sequencer 167 creates various control signals. The buffer 168 and the selector 170 select one of DI from the serial-parallel conversion circuit 132, a status from the packet check circuit 142, or data pointers from the DMAC 44, using a SEL signal from the packet check circuit 142.

The FIFO 34 functions as a buffer for adjusting the phase of RD (which is output data from the link core 20) and the phase of WDATA (which is data to be written to the RAM 80), and it comprises a FIFO state judgement circuit 35. The FIFO state judgement circuit 35 makes an EMPTY signal go active when the FIFO is empty and a FULL signal go active when the FIFO is full.

The DMAC 44 comprises a packet division circuit 180, an access request execution circuit 190, and an access request generation circuit 192.

The packet division circuit 180 in this case divides packets that have been shaped by the packet shaping circuit 160 into data, headers, and other parts, based on the tags (DTAGs), then writes those parts to the various RAM areas (see FIG. 5).

The access request execution circuit 190 executes access requests from the link core 20. When the FULL signal from the FIFO state judgement circuit 35 is active, the access request execution circuit 190 makes a FFULL signal go active. The sequencer 167 within the packet shaping circuit 160 makes RDS, which is a RD (RxData) strobe signal, go active on condition that FFULL is not active.

Note that RFAIL is a signal used by the sequencer 167 to inform the access request execution circuit 190 that a reception has failed.

The access request generation circuit 192 issues an access request to the RAM 80. The access request generation circuit 192 receives WACK (which is a write acknowledgment from the buffer manager 70) and EMPTY from the FIFO state judgement circuit 35, and outputs WREQ (which is a write request) to the buffer manager 70.

4.2 Packet Division and Writing to RAM Areas

The tag generation circuit 162 generates 4-bit tags, as shown in FIG. 21. The link core 20 outputs the thus-generated 4-bit tags simultaneously to the FIFO 34, while outputting the start (the first quadlet), header, data (ORB and stream) of each packet (see FIG. 20B) as RD to the FIFO 34. With this embodiment of the present invention, these tags are used in packet division and writing to the various areas in RAM (see FIGS. 5 and 10).

More specifically, a tag determination circuit 182 shown in FIG. 19 identifies the DTAG codes (tags) that are output by the FIFO 34 and determines the write area for the output WDATA of the FIFO 34. A pointer update circuit 184 comprised within the address generation circuit 188 sequentially updates (increments or decrements) the pointers (data pointer and header pointer) in the thus-determined area. The address generation circuit 188 generates an address as indicated by the sequentially updated pointers and outputs it as WADR to the buffer manager 70. This configuration ensures that the header, ORB, and stream of each packet are written to the corresponding areas in RAM, as shown in FIG. 5.

Note that the address generation circuit 188 outputs a data pointer DP (a data pointer for the reception ORB area or a data pointer for the reception stream area) to the packet shaping circuit 160 and the packet shaping circuit 160 embeds this data pointer in the header of the packet (see C30 in FIG. 20B). This makes it possible to link each header stored in the header area to the corresponding data stored in the data area.

The tag generation circuit 162 generates the tags of FIG. 21 by using the transaction label tl that was described with reference to FIGS. 13A and 13B, and outputs them to the FIFO 34. If the output RD of the link core 20 is a header and the transaction label tl is 1xxxxx (where "x" means "don't care"), by way of example, the tag generation circuit 162 generates the tag (1001) or (1010). This ensures that the header of the corresponding received packet is written to the reception header area for hardware (HW), as shown in FIG. 14. Note that "for hardware/HW" in this case denotes that this data is for the SBP-2 core 84 of FIG. 4.

If the output RD of the link core 20 is a header and tl is 0xxxxx, the tag generation circuit 162 generates the tag (0001) or (0010). This ensures that the header of the received packet is written to the reception header area for FW.

Similarly, if RD is data and tl is 11xxxx, the tag (1101) is generated. This ensures that the data (stream) of the received packet is written to the reception stream area for HW.

Furthermore, if RD is data and tl is 10xxxx, the tag (1100) is generated. This ensures that the data (ORB) of the received packet is written to the reception ORB area for HW.

In addition, if RD is data and tl is 01xxxx, the tag (0101) is generated. This ensures that the data (stream) of the received packet is written to the reception stream area for FW.

Finally, if RD is data and tl is 00xxxx, the tag (0100) is generated. This ensures that the data (ORB) of the received packet is written to the reception ORB area for FW.

The use of the transaction label tl by this embodiment of the invention as described above makes it possible to implement packet division and writing to the various areas in RAM.

4.3 Stream Area Management and Start/End Address Setting

Figure 22:
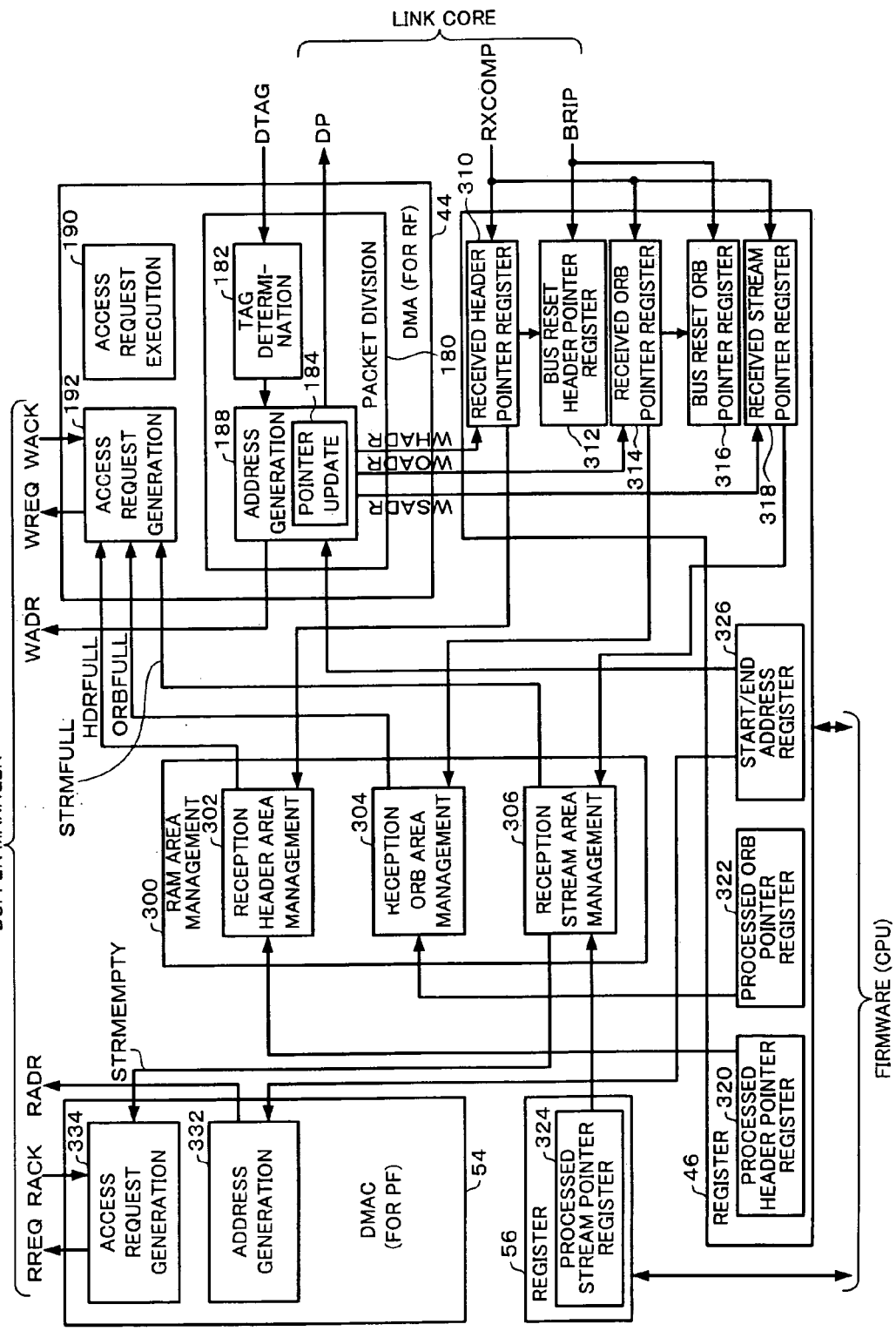
FIG. 22 shows details of the configuration of the DMACs, registers, and the RAM area management circuit.

A detailed example of the configuration of the DMACs 44 and 54, the registers 46 and 56, and the RAM area management circuit 300 is shown in FIG. 22.

Figure 23:
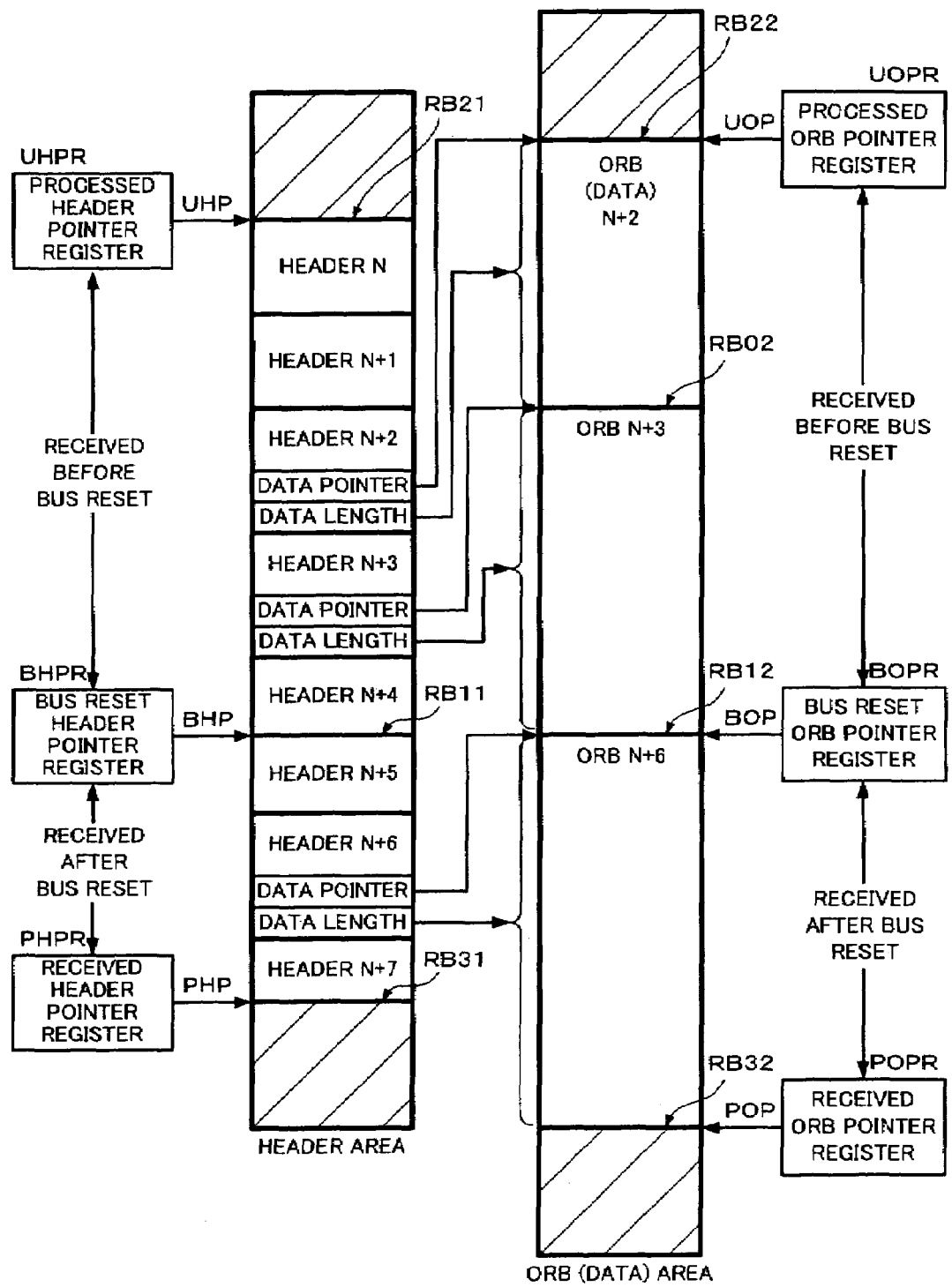
FIG. 23 illustrates the various pointer registers.

The description first concerns the various pointer registers 310, 312, 314, 316, 318, 320, 322, and 324 shown in FIG. 22. In this embodiment of the present invention, the pointer registers shown in FIG. 23 are provided for management of the areas in RAM. At any time, the firmware (CPU) can read pointer addresses that are stored in these pointer registers, though the CPU interface 60 of FIG. 4.

In this case, a processed header pointer register UHPR holds a pointer UHP that indicates a boundary RB21 between processed (used) headers and unprocessed headers. A received header pointer register PHPR holds a pointer PHP that indicates a boundary RB31 between the most recent (post) received header and a non-received header.

Similarly, a processed ORB pointer register UOPR holds a pointer UOP that indicates a boundary RB22 between processed ORBs and unprocessed ORBs. A received ORB pointer register POPR contains a pointer POP that indicates a boundary RB32 between the most recent received ORB and a non-received ORB.

Note that a bus reset header pointer register BHPR holds a pointer BHP that indicates a boundary RB11 between the header of a packet received before the occurrence of a bus reset and the header of a packet received after the occurrence of the bus reset. Similarly, a bus reset ORB pointer register BOPR holds a pointer BOP that indicates a boundary RB12 between the ORB of a packet received before the occurrence of a bus reset and the ORB of a packet received after the occurrence of the bus reset. The provision of these registers BHPR and BOPR enables the firmware to detect the location at which the bus reset occurred, in a simple manner. This makes it possible to greatly reduce the processing load on the firmware after the occurrence of a bus reset.

The description returns to FIG. 22. The registers 310, 314, and 318 of FIG. 22 are registers for storing the received header pointer, the received ORB pointer, and the received stream pointer, respectively. These registers 310, 314, and 318 receive WHADR (address of the header area), WOADR (address of the ORB area), and WSADR (address of the stream area) from the address generation circuit 188. The registers 310, 314, and 318 also receive a signal RXCOMP (a signal that goes active when reception is completed) from the link core 20. The registers 310, 314, and 318 fetch and store WHADR, WOADR, and WSADR from the address generation circuit 188 at the timing at which this RXCOMP goes active. This makes it possible to store the addresses of the boundaries RB31, RB32, etc., of FIG. 23.

Registers 312 and 316 are registers for storing the bus reset header pointer and bus reset ORB pointer, respectively. These registers 312 and 316 receive a BRIP signal (a signal that is active during a bus reset) from the link core 20. The registers 312 and 316 fetch and store the addresses that are stored in the registers 310 and 314 at the timing at which this BRIP goes active. This makes it possible to store the addresses of the boundaries RB11 and RB12 of FIG. 23.

Registers 320, 322, and 324 are registers for storing the processed header pointer, the processed ORB pointer, and the processed stream pointer, respectively.

A start/end address register 326 stores the start address and end address of each area shown in FIG. 5. More specifically, it is configured of registers (the transmission area start address register TSR, the transmission area end address register TER, the reception area start address register RSR, and the reception area end address register RER) that hold the transmission area start address TS, the transmission area end address TE, the reception area start address RS, and the reception area end address RE, respectively, that were described with reference to FIG. 16. Address generation circuits 188 and 332 control the generation of addresses, based on the start and end addresses from the register 326. More specifically, they update the pointers sequentially, using each start address as a start point. If a pointer has passed an end address, the control is such that the pointer returns to the corresponding start address (ring buffer structure).

The RAM area management circuit 300 comprises a reception header area management circuit 302, a reception ORB area management circuit 304, and a reception stream area management circuit 306.

The reception header area management circuit 302 receives the received header pointer from the register 310 and the processed header pointer from the register 320, and outputs a signal HDRFULL indicating that the reception header area is full to the access request generation circuit 192.

The reception ORB area management circuit 304 receives the received ORB pointer from the register 314 and the processed ORB pointer from the register 322, and outputs a signal ORBFULL indicating that the reception ORB area is full to the access request generation circuit 192.

The reception stream area management circuit 306 receives the received stream pointer from the register 318 and the processed stream pointer from the register 324, and outputs the signal STRMFULL indicating that the reception stream area is full to the access request generation circuit 192. It also outputs a signal STRMEMPTY indicating that the reception stream area is empty to an access request generation circuit 334.

The access request generation circuits 192 and 334 receive these full and empty signals and determine whether or not to output a write request WREQ or read request RREQ to the buffer manager 70.

This ensures that management of the reception stream areas is done by the hardware of the reception stream area management circuit 306 in accordance with this embodiment of the present invention, without involving the firmware. It is therefore possible to reduce the processing load on the firmware, as described with reference to FIG. 12, and also dramatically increase the data transfer speed.

5. Electronic Equipment

The description now turns to examples of electronic equipment comprising the data transfer control device of this embodiment of the invention.

Figure 24A:
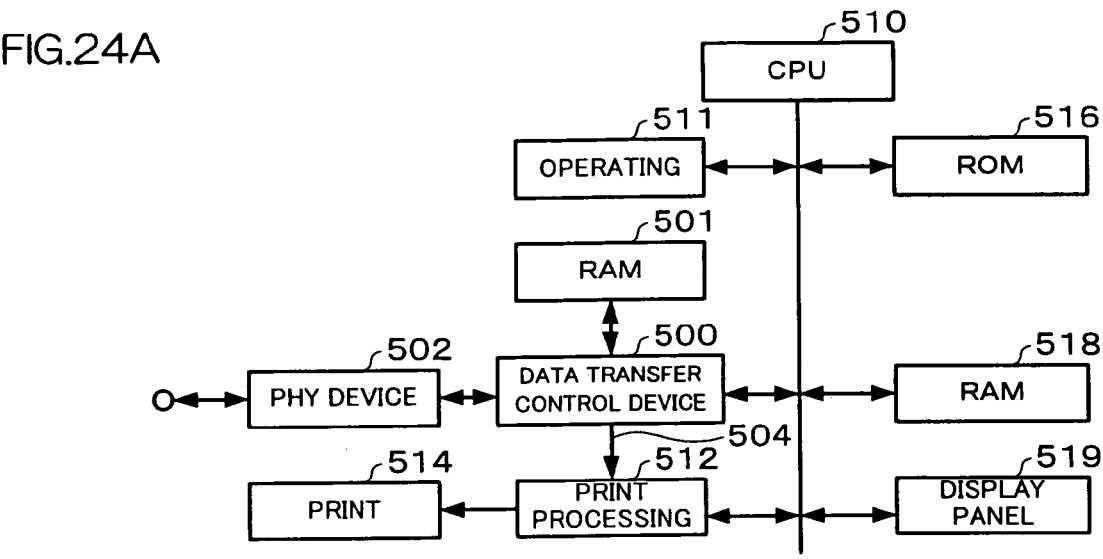
FIGS. 24A, 24B, and 24C show examples of the internal block diagrams of various items of electronic equipment.
Figure 25A:
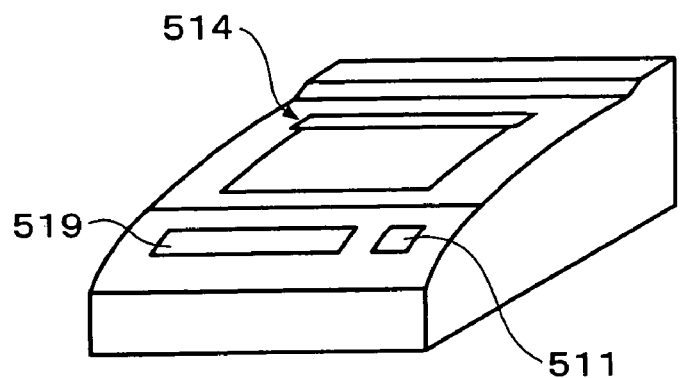
FIGS. 25A, 25B, and 25C show external views of various items of electronic equipment.

An internal block diagram of a printer that is one example of such electronic equipment is shown in FIG. 24A with an external view thereof being shown in FIG. 25A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY device 502 and a data transfer control device 500 is sent directly to a print processing section 512 over a bus 504. The print data is subjected to given processing by the print processing section 512 and is output for printing to paper by a print section (a device for outputting data) 514 comprising components such as a print head.

Figure 24B:
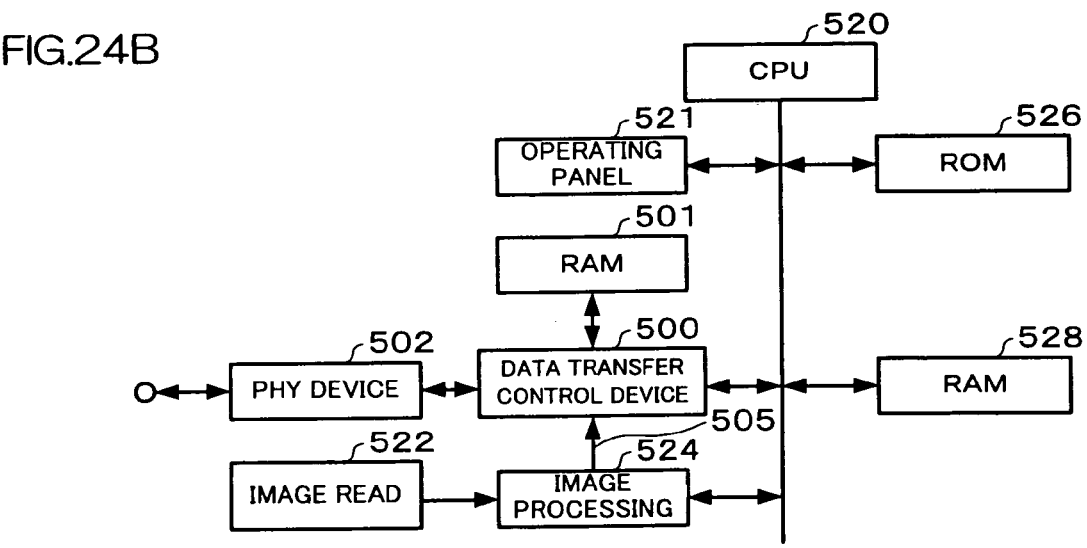
Figure 25B:
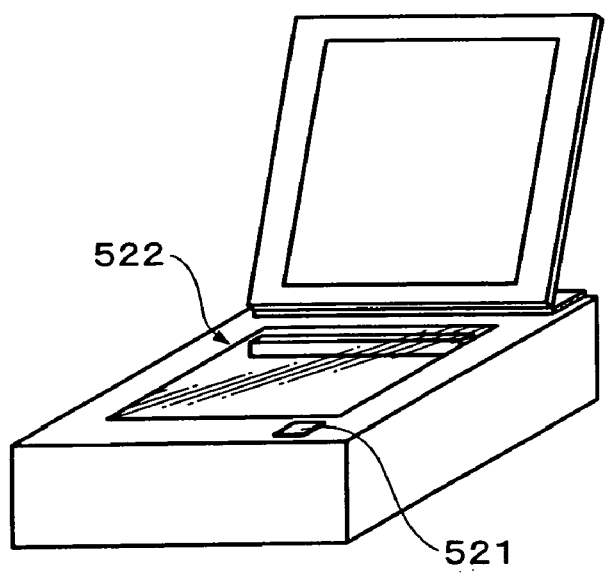

An internal block diagram of a scanner that is another example of electronic equipment is shown in FIG. 24B with an external view thereof being shown in FIG. 25B. A CPU 520 has various functions, including that of controlling the entire system. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY device 502 to another node such as a personal computer.

Figure 24C:
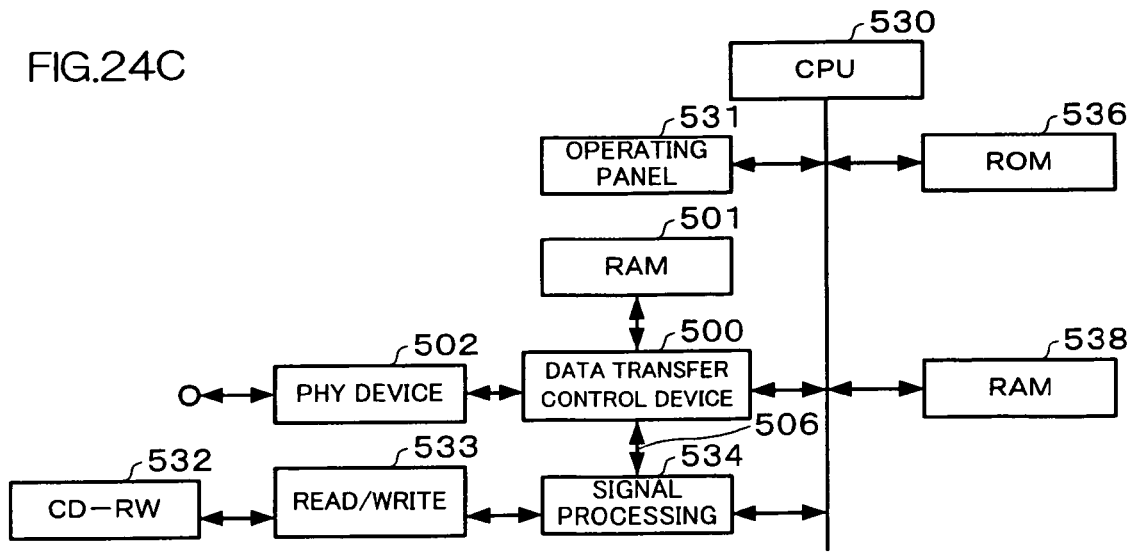
Figure 25C:
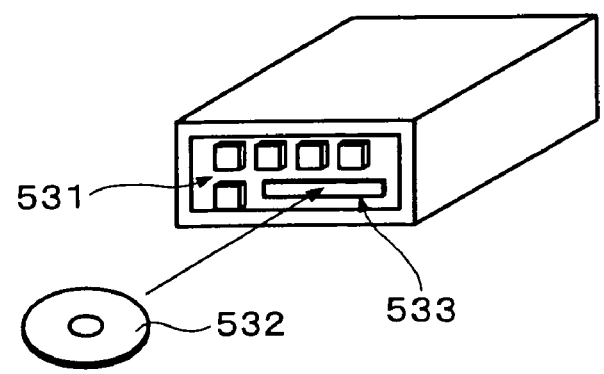

An internal block diagram of a CD-RW drive that is a further example of electronic equipment is shown in FIG. 24C with an external view thereof being shown in FIG. 25C. A CPU 530 has various functions, including that of controlling the entire system. An operating section 531 is designed to allow the user to operate the CD-RW. Data such as a control program is stored in a ROM 536 and a RAM 538 functions as a work area for the CPU 530.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets through the PHY chip 502 to another node such as a personal computer.

Data that has been sent in from another node through the PHY chip 502 and the data transfer control device 500, on the other hand, is sent directly to the signal processing section 534 over the bus 506. The data is subjected to given signal processing by the signal processing section 534 then is stored by the read/write section 533 into the CD-RW 532.

Note that a separate CPU for providing data transfer control with respect to the data transfer control device 500 could be provided in addition to the CPU 510, 520, or 530 of FIG. 24A, 24B, or 24C.

In addition, a RAM 501 (equivalent to the RAM 80 of FIG. 4) is shown provided outside the data transfer control device 500 in FIGS. 24A, 24B, and 24C, but the RAM 501 could equally well be provided within the data transfer control device 500.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-RW or write data to a CD-RW at high speeds. The present invention also makes it simple to use a plurality of items of electronic equipment connected to one host system or a plurality of items of electronic equipment connected to a plurality of host systems, for example.

Use of the data transfer control device of this embodiment in electronic equipment also reduces the processing load on firmware running on the CPU, making it possible to use an inexpensive CPU and low-speed buses. This also enables reductions in the cost and size of the data transfer control device, thus reducing the cost and size of the electronic equipment.

Note that the electronic equipment that can employ a data transfer control device in accordance with the present invention is not limited to the above described embodiments, and thus various other examples can be considered, such as various types of optical disk drive (CD-ROM or DVD), magneto-optic disk drives (MO), hard disk drives, TVs, VTRs, video cameras, audio equipment, telephones, projectors, personal computers, electronic organizers, and dedicated wordprocessors.

Note also that the present invention is not limited to the embodiments described herein, and various modifications are possible within the scope of the invention as laid out herein.

For example, the configuration of the data transfer control device in accordance with the present invention may be that as shown in FIG. 4, but it is not limited thereto.

Similarly, the packet division method and the methods used to write/read packets with respect to the various areas of the packet storage means are not limited to the methods described with reference to FIGS. 5 and 10.

First data may be data for the transaction layer and second data may be data for the application layer, but the first and second data in accordance with the present invention is not specifically limited thereto.

The processing based on the indication information comprised within the transaction identification information of response packets may be the writing of response packets (headers and data) to the areas indicated by the indication information, but the present invention is not limited thereto.

Similarly, the present invention can be applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data between a plurality of nodes connected to a bus, the data transfer control device comprising:
   a link circuit that provides services for packet transfer between the plurality of nodes;
   a write circuit that writes a packet that has been received through the link circuit to a packet storage memory; and
   a packet division circuit that writes control information of the packet to a control information area of the packet storage memory, writes first data of the packet for a first layer to a first data area of the packet storage memory, and writes second data of the packet for a second layer that is a layer above the first layer to a second data area of the packet storage memory,
   the first data being command data used by a protocol of the first layer and the second data being stream data used by an application layer, and the second data being read sequentially from the second data area and the read second data is transferred to an application layer device,
   the data transfer control device transmitting a request packet for starting a transaction to a responding node among the plurality of nodes,
   the request packet including transaction identification information that contains indication information, the indication information indicating a process to be performed when the data transfer control device receives a response packet as the packet from the responding node, the transaction identification information being a transaction label, and
   the first data and the second data of the response packet being written into separate data areas as specified by the indication information within the transaction identification information of the response packet, when the response packet from the responding node is received.

2. The data transfer control device as defined in claim 1, further comprising an area management circuit that makes a full signal go active when the second data area is full, to inhibit the write circuit from writing the second data to the second data area, and makes an empty signal go active when the second data area is empty, to inhibit the second layer from reading the second data from the second data area.

3. The data transfer control device as defined in claim 1, data transfer being in accordance with the IEEE 1394 standard.

4. The data transfer control device as defined in claim 1,
the link circuit comprising a tag generation circuit that generates a tag being information for delimiting areas, and
the packet division circuit writing control information of the packet to the control information area, writing the first data of the packet for the first layer to the first data area, and writing the second data of the packet for the second layer to the second data area, based on the tag generated by the tag generation circuit.

5. The data transfer control device as defined in claim 1, the first data area being an operational request block area and the second area being a stream area.

6. Electronic equipment comprising:
a data transfer control device for transferring data between a plurality of nodes connected to a bus, comprising:
  a link circuit that provides services for packet transfer between the plurality of nodes;
  a write circuit that writes a packet that has been received through the link circuit to a packet storage memory; and
  a packet division circuit that writes control information of the packet to a control information area of the packet storage memory, writes first data of the packet for a first layer to a first data area of the packet storage memory, and writes second data of the packet for a second layer that is a layer above the first layer to a second data area of the packet storage memory,
  the first data being command data used by a protocol of the first layer and the second data being stream data used by an application layer, and the second data being read sequentially from the second data area and the read second data is transferred to an application layer device,
  the data transfer control device transmitting a request packet for starting a transaction to a responding node among the plurality of nodes,
  the request packet including transaction identification information that contains indication information, the indication information indicating a process to be performed when the data transfer control device receives a response packet as the packet from the responding node, the transaction identification information being a transaction label, and
  the first data and the second data of the response packet being written into separate data areas as specified by the indication information within the transaction identification information of the response packet, when the response packet from the responding node is received;
a device which performs given processing on data that has been received from another node through the data transfer control device and a bus; and
a device which outputs or stores data that has been subjected to processing.

7. Electronic equipment comprising:
a data transfer control device for transferring data between a plurality of nodes connected to a bus, comprising:
  a link circuit that provides services for packet transfer between the plurality of nodes;
  a write circuit that writes a packet that has been received through the link circuit to a packet storage memory; and
  a packet division circuit that writes control information of the packet to a control information area of the packet storage memory, writes first data of the packet for a first layer to a first data area of the packet storage memory, and writes second data of the packet for a second layer that is a layer above the first layer to a second data area of the packet storage memory,
  the first data being command data used by a protocol of the first layer and the second data being stream data used by an application layer, and the second data being read sequentially from the second data area and the read second data is transferred to an application layer device,
  the data transfer control device transmitting a request packet for starting a transaction to a responding node among the plurality of nodes,
  the request packet including transaction identification information that contains indication information, the indication information indicating a process to be performed when the data transfer control device receives a response packet as the packet from the responding node, the transaction identification information being a transaction label, and
  the first data and the second data of the response packet being written into separate data areas as specified by the indication information within the transaction identification information of the response packet, when the response packet from the responding node is received;
a device which performs given processing on data that is to be transferred to another node through the data transfer control device and a bus; and
a device which takes in data to be subjected to processing.

8. A data transfer control device for transferring data between a plurality of nodes connected to a bus, the data transfer control device comprising:
  a link circuit that provides services for packet transfer between the plurality of nodes;
  a write circuit that writes a packet that has been received through the link circuit to a packet storage memory; and
  a packet division circuit that writes control information of the packet to a control information area of the packet storage memory, writes first data of the packet for a first layer to a first data area of the packet storage memory, and writes second data of the packet for a second layer that is a layer above the first layer to a second data area of the packet storage memory;
  a first bus for connecting to an application layer device;
  a second bus for transferring control signals of the data transfer control device from a control device;
  a third bus for connecting to a physical layer device;
  a fourth bus for connecting to the packet storage memory;
  a fifth bus for connecting to a circuit that implements part of the first layer protocol by hardware; and
  an arbitration circuit that performs the arbitration for establishing a data path between one of the first, second, third, and fifth buses and the bus,
  the first data being command data used by a protocol of the first layer and the second data being stream data used by an application layer, and the second data being read sequentially from the second data area and the read second data is transferred to the application layer device.

* * * * *